US009100800B2

(12) United States Patent
Rao

(10) Patent No.: US 9,100,800 B2
(45) Date of Patent: *Aug. 4, 2015

(54) SYSTEM AND METHOD FOR QUESTIONNAIRES AND USER INTERACTIONS WITH A PLURALITY OF MOBILE DEVICE RECIPIENTS

(71) Applicant: Bindu Rama Rao, Laguna Niguel, CA (US)

(72) Inventor: Bindu Rama Rao, Laguna Niguel, CA (US)

(*) Notice: Subject to any disclaimer, the term of this patent is extended or adjusted under 35 U.S.C. 154(b) by 140 days.

This patent is subject to a terminal disclaimer.

(21) Appl. No.: 14/059,878

(22) Filed: Oct. 22, 2013

(65) Prior Publication Data

US 2014/0045469 A1 Feb. 13, 2014

Related U.S. Application Data

(63) Continuation of application No. 13/484,605, filed on May 31, 2012, now Pat. No. 8,565,719, which is a continuation of application No. 11/807,670, filed on May 30, 2007, now Pat. No. 8,270,893, application No. 14/059,878, which is a continuation-in-part of application No. 10/985,702, filed on Nov. 10, 2004, now abandoned.

(60) Provisional application No. 60/849,715, filed on Oct. 4, 2006, provisional application No. 60/850,084, filed on Oct. 7, 2006.

(51) Int. Cl.
*H04M 3/42* (2006.01)
*H04W 4/06* (2009.01)
*G06Q 30/02* (2012.01)
*H04M 1/725* (2006.01)

(52) U.S. Cl.
CPC ................ *H04W 4/06* (2013.01); *G06Q 30/02* (2013.01); *H04M 1/72522* (2013.01)

(58) Field of Classification Search
CPC ... H04W 4/06; H04W 1/72522; G06Q 30/02; G06Q 10/10; G06Q 30/102; H04L 29/08108; H04M 2207/18; H04M 4/02; H04M 8/18; G06F 17/30867
USPC ............. 455/2.01, 406, 414.1, 466; 705/7.32; 709/206; 715/716
See application file for complete search history.

(56) References Cited

U.S. PATENT DOCUMENTS

| | | | |
|---|---|---|---|
| 6,477,504 B1* | 11/2002 | Hamlin et al. | 705/7.32 |
| 6,873,688 B1* | 3/2005 | Aarnio | 379/92.02 |
| 7,899,700 B2* | 3/2011 | Floyd et al. | 705/7.32 |
| 2002/0006124 A1* | 1/2002 | Jimenez et al. | 370/352 |
| 2003/0060284 A1* | 3/2003 | Hamalainen et al. | 463/42 |
| 2003/0211856 A1* | 11/2003 | Zilliacus | 455/466 |
| 2004/0073476 A1* | 4/2004 | Donahue et al. | 705/10 |
| 2004/0128183 A1* | 7/2004 | Challey et al. | 705/10 |
| 2005/0009465 A1* | 1/2005 | Ross et al. | 455/2.01 |
| 2005/0054286 A1* | 3/2005 | Kanjilal et al. | 455/3.05 |
| 2005/0181722 A1* | 8/2005 | Kopra et al. | 455/2.01 |
| 2007/0050256 A1* | 3/2007 | Walker et al. | 705/14 |

* cited by examiner

*Primary Examiner* — Mahendra Patel

(57) ABSTRACT

A questionnaire system in which a mobile device is used by user to create questionnaires and send it to other recipients. The questionnaire is created by user of a mobile device using audio inputs for a questionnaire preamble and question preambles. A server in the network incorporates other generic portions of the questionnaire as necessary. Thus, a user can make adhoc questionnaires, send them to recipients and receive the results provided by the recipients from their respective mobile devices.

20 Claims, 20 Drawing Sheets

SYSTEM AND METHOD FOR QUESTIONNAIRES AND USER INTERACTIONS WITH A PLURALITY OF MOBILE DEVICE RECIPIENTS

CROSS REFERENCES TO RELATED APPLICATIONS

The present application is a continuation of, makes reference to, claims priority to, and claims benefit of U.S. patent application Ser. No. 13/484,605 entitled SYSTEM AND METHOD FOR QUESTIONNAIRES AND USER INTERACTIONS, set to issue on Oct. 22, 2013 as U.S. Pat. No. 8,565,719 filed on May 31, 2012, which in turn is a continuation of, makes reference to, claims priority to, and claims benefit of U.S. patent application Ser. No. 11/807,670 entitled MOBILE DEVICE AND SERVER CAPABLE OF SUPPORTING ADHOC QUESTIONNAIRES filed on May 30, 2007, while in turn the U.S. patent application Ser. No. 11/807,670 itself makes reference to, claims priority to, and claims benefit of U.S. Provisional Application Ser. No. 60/849,715 entitled QUESTIONNAIRE CLIENT FOR MOBILE DEVICE filed on Oct. 4, 2006, and to U.S. Provisional Application Ser. No. 60/850,084 entitled MOBILE DEVICE FOR CREATING ADHOC QUESTIONNAIRE filed on Oct. 7, 2006. The complete subject matter of the above mentioned patents, patent applications and provisional patent applications are hereby incorporated herein by reference, in their entirety.

In addition, the present application makes reference to U.S. application Ser. No. 10/985,702 entitled QUESTIONNAIRE NETWORK FOR MOBILE HANDSETS filed on Nov. 10, 2004, the complete subject matter of which is hereby incorporated herein by reference, in its entirety.

BACKGROUND

1. Technical Field

The present invention relates generally to the interactions between mobile handset and a server within a carrier network, and more specifically to the ability to create questionnaires from a mobile handset, store them in a network, disseminate them and collect results.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry by means of the small keyboard (with multiple letters assigned to each key), and only brief user inputs can be solicited from a user without annoying the user.

Often a user would want to ask his friend which movie, from a selection of movies currently playing, that they want to see. A user has to cumbersomely call up each of his friends and repeat the same questions, talk about movies currently showing, and ask them which one they would want to see in a group today. The whole process is time consuming, expensive, and requires all his friends to be available for the conversation to be satisfactorily completed. Thus, any attempt by a user to solicit information or feedback from his friends is likely to involve having to make several phone calls.

User interactions in real time, such as those provided for a user using a PC on the Internet, are often not possible for a user using a cell phone. For example, the amount of textual information cannot be a full page of textual information that is typically made available on a PC. Graphical information also cannot be large when presented on a cell phone as they typically are on a webpage accessed over a PC. A typical website provides a rich multi-media experience. The same website, when accessed from a cell phone, would be not only unreadable but also frustrating. Thus, there is a problem in presenting a user with information in order to solicit user input, when the user is using a cell phone rather than a PC.

Cell phones are therefore a device for which traditional websites on the Internet are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unmanageable and difficult to browse and navigate on a cell phone with a small LCD screen and small keyboard for user input.

Cell phone users often solicit information from other cell phone users by making phone calls. For example, quite often a user of a mobile device (such as a cell phone) would like to determine where his friends would like to have dinner from among all the nearby restaurants. The user may have to call each and every one of his interested friends to determine their preferences, in order to determine which restaurant would be the preferred one for the group as a whole. This would take at least as many calls as the number of interested friends, and would take the same amount of time for each such call, and incur significant costs to the user. There does not exist an easy way for a user to send a questionnaires from his mobile device for that purpose, in order to solicit feedback from his friends using the mobile device.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
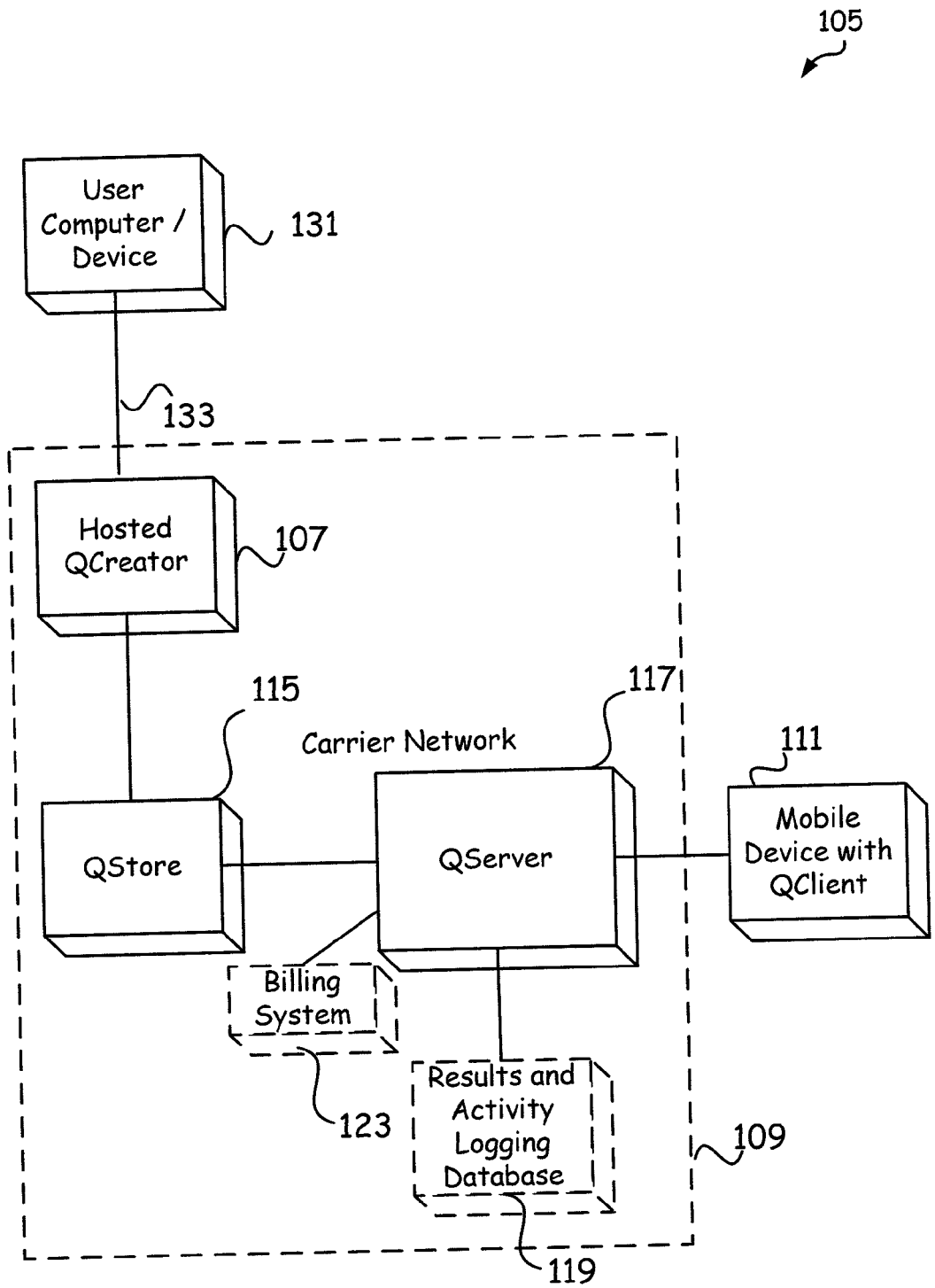
FIG. 1 is a perspective block diagram of a network for mobile devices that facilitates creation and dissemination of questionnaires to a mobile device, the browsing through the questionnaire by a user on the mobile device, and results gathering activities.

FIG. 1 is a perspective block diagram of a network 105 for mobile devices that facilitates creation and dissemination of questionnaires to a mobile device 111, the browsing through the questionnaire by a user on the mobile device 111, and results gathering activities. The network 105 supports the notification of the availability of the questionnaire to the mobile device 111 and the dissemination of questionnaires to the mobile device 111. The user interaction is facilitated by a client component in the mobile device 111 called QClient, which is either made available by the manufacturer of the mobile device or subsequently downloaded (such as over the air), or otherwise installed by the user.

The network 105 comprises a mobile device 111 communicatively coupled to a management server called QServer 117 that is typically located within a network 109, such as a carrier network. It also comprises a questionnaire repository called QStore 115 that is accessible by the QServer 117 and also by a hosted data population component called QCreator 107, an optional billing system 123 and an optional results and activity logging database 119.

The hosted Qcreator 107 helps a user of the mobile device 111 create questionnaires using a user computer 131 and store it in the QStore 115. This stored questionnaire is accessible by the QServer 117 for dissemination. The user of the mobile device 111 can then instruct the QServer 117 to send the saved questionnaire to one or more friends or family members via their respective mobile devices or computers. For example, the user can provide a list of phone numbers corresponding to the mobile devices used by the friends and family members with whom the user intends to share the stored questionnaire. The results from each friend or family member, as they respond to the questionnaire (i.e. as they answers questions in a questionnaire) is gathered, collated and subsequently presented to the mobile device 111 of the questionnaire sender by the QServer 117. The user creating the questionnaire can specify an optional "max wait time" for the questionnaire that will be used to determine how long the QServer should wait before reporting the collated results to the questioner sender, in this use-case, the user of the mobile device 111. In one related embodiment, results are not collated—instead they are reported immediately after the questionnaire is completed by any recipient/user.

The hosted QCreator 107 provides a simple questionnaire hosted component (SQH) that is easily usable by any user, such as teenagers. For example, a teenager who wants to invite his friends to a movie could just create a question preamble in audio/voice that comprises user's enumeration of movie choices, and the hosted QCreator 107 automatically inserts reference indices or sequence numbers to facilitate selection of one or more choices from a recipient user. on his mobile device Thus a mobile recipient user's selection options such as a sequence of (multiple-choice) A, B, C, D as choices, or a sequence of numbers 1, 2, 3 and 4 is provided automatically for display to a recipient user during an appropriate part of segment of the questionnaire. Thus, the multiple-choice provided automatically is displayed while the audio preamble of a question in a questionnaire is rendered/ played on the mobile device of the recipient user with no extra text needed for describing the actual choices which are incorporated into the audio preamble by the user creating the question, that provides details associated with these indices or multiple-choice sequences.

Adhoc questionnaire creation is facilitated by the hosted creator 107. The adhoc questionnaire would be a form of a questionnaire with only one question. It is possible to create adhoc questionnaires with more than one question too. However, most adhoc questionnaires are likely to be one question at a time. For example, a user using the hosted QCreator component 107 (which is hosted along with the Qserver 117 or provided as part of the QServer 117) for adhoc question creation could vocalize (speak) an audio preamble to a question (recording being facilitated by a dialog box with Start and Stop buttons): "Guys, for tonight's movie, the choices are A) Jaws, B) KingKong C) Room with a View. Please Pick one". The user could optionally type in a textual preamble on an appropriate webpage provided by the QServer 117. The textual preamble provided would be in addition to the audio preamble of the question that is recorded. Recording can be in the form of AMR, MP3, WMA or other popular formats. The user could also provide a list of recipients using an appropriate webpage provided by the QServer 117. Thus, when the adhoc questionnaire is sent to a recipient, the recipient would get this customized audio preamble, see a user provided personalized textual prompt (called preamble for the question) or just a generic text preamble (i.e if the user has not provided a prompt/preamble), and get a multiple-choice enumeration of A, B, C to chose from.

In one embodiment, the hosted QCreator component 107 is incorporated into the QServer 117 and the user, employing the mobile device 111 (source mobile device) interacts with the Qserver 117 to create a questionnaire. The user intending to create a questionnaire using the mobile device 111, such as an adhoc questionnaire, accesses the website associated with (or part of) the QServer 117, and populates a questionnaire. For example, the user provides an audio input for a questionnaire preamble, audio preamble for each question in the questionnaire, and textual content for each question, such as textual prompts that are stored as textual preambles for the corresponding question. The user does not provide any multiple-choices for a recipient to select from, as the multiple-choices are incorporated into the audio preamble (provided by user as part of the audio preamble for the associated question). The QServer 107 then incorporates the multiple-choices from a generic set of multiple choices for each question in the questionnaire. For example, the generic set of choices can be 1, 2, 3, 4, or A, D, G, J (the first characters of the keys corresponding to the typical mobile keyboard with numbers 2, 3, 4 and 5 on the face plate), etc. The questionnaire with the automatically incorporated multiple-choice textual content for each question is saved for future use per user instruction, or forwarded to a list of recipients provided by the user. Individual recipients can answer the questionnaire at their convenience, and the QServer 117 facilitates the interaction with the mobile devices (or other types of devices such as computers) of each recipient in completing the questionnaire by the recipients from their respective mobile devices. Results are collated by the QServer 117 and forwarded if the user so prefers it. Otherwise, individual results from each recipient's device, when the associated recipient has completed the questionnaire, are communicated back to the mobile device 111 (the source mobile device) one at a time.

In one embodiment, the questionnaire preamble is not created by the user populating the questionnaire using the QCreator 107, only the question preamble is created. Thus, each question comprises a question preamble provided by the user. When a recipient gets the questionnaire on his mobile device, the questions themselves are provided to the recipient, starting with the first one, without the preamble of the questionnaire. Thus, in the beginning of the questionnaire, the recipient would view the first question (or just the multiple-choices for it) and would be able (for example, by activating the Info menu item) to hear the audio preamble for the first question. The recipient selects one of the choices presented, using the selection button (often the single scrolling/selection button) or a joystick button (5-way joystick buttons are common on mobile devices). The recipient can also select by using the keyboard, such as entering one of the keys A, D, G, or J, (say, by selecting D). In a related embodiment, the choices presented to user are 2, 3, 4, 5 (corresponding to adjacent keys on a typical mobile phone keyboard) and the user selects one of the numeric keys 2, 3, 4 or 5, on the recipient mobile device keyboard, before activating the Next menu item to proceed to the next question, if any.

In one embodiment, the user accesses the website of QServer 117 using the mobile device 111 in order to create a questionnaire comprising multiple questions or a single question. In another, he accesses the website associated with the QServer 117 employing the user computer 131 in order to create the questionnaire (or a single question). In both the cases, the user is able to specify who the recipients should be for the questionnaire.

Typically, recipients for questionnaires are specified by the user of the mobile device 111 (used to create a questionnaire) in one of several ways—by picking one or more recipients from a contact list in the mobile device, by identifying a pre-configured mailing list on the mobile device, by identifying a preconfigured list of phone numbers on the mobile device, etc.

While using the user computer/device 131 to create a questionnaire, the user can assign the questionnaire to a pre-configured list of recipients previously stored at the QStore 115.

In one embodiment, the network's 109 monthly billing system 123, that bills users for landline phone subscriptions or wireless services, is also used as a means to provide incentive payments, discounts or rewards to users for completing questionnaires or surveys. It is also used to optionally charge a user for services rendered in creating questionnaires. It can also be used to provide a user a discount on monthly charges for answering a questionnaire. For example, the user's monthly phone bill would discount the monthly payment for the user by $5.00 (or some such amount) for every questionnaire completed by a user of the mobile device 111. In addition, for users who create questionnaires on their mobile devices 111, the billing system charges them a fee for creating questionnaires and distributing them to a plurality of users.

In one embodiment, when a user creates a questionnaire and uploads it for sending it to other users (such as his friends or customers) charging can be conducted at a flat rate or based on the number of users to whom the questionnaire is communicated. Other charging models are also contemplated. For example, in one charging model, a user sending a questionnaire is charged a certain questionnaire creation fee (such as 20 cents) per questionnaire and each of the recipients who receive the questionnaire are charged a further questionnaire receiving fee (such as 20 cents each). In a related model, the sender is charged for each recipient to whom the questionnaire is sent, while the recipients responding to the questionnaire are not charged any fee.

In one embodiment, the Qserver 117 makes it possible to manage the lifecycle of individual questionnaires and the user accounts setup by registered users of a questionnaire creation and distribution service. The QServerv 117 behaves as a questionnaire management server with the capability of creating, distributing, deleting, archiving and logging questionnaires, questionnaire access activities, etc.

The network 105 for mobile devices facilitates creation and dissemination of audio-assisted questionnaires, wherein parts of the questionnaire are presented to a recipient in audio form, so as to minimize the amount of text the recipient has to read in a small screen of a limited device, so as to make it easy for the recipient to listen to preambles, supplementary information, etc. in audible form (human voices for the most part), and also to make questionnaire display and review an easy activity that does not require use of a keyboard at all in most instances, and reduces/eliminates the use of keys (for scrolling or for answering the questionnaire) on a mobile device to a large extent.

Figure 2:
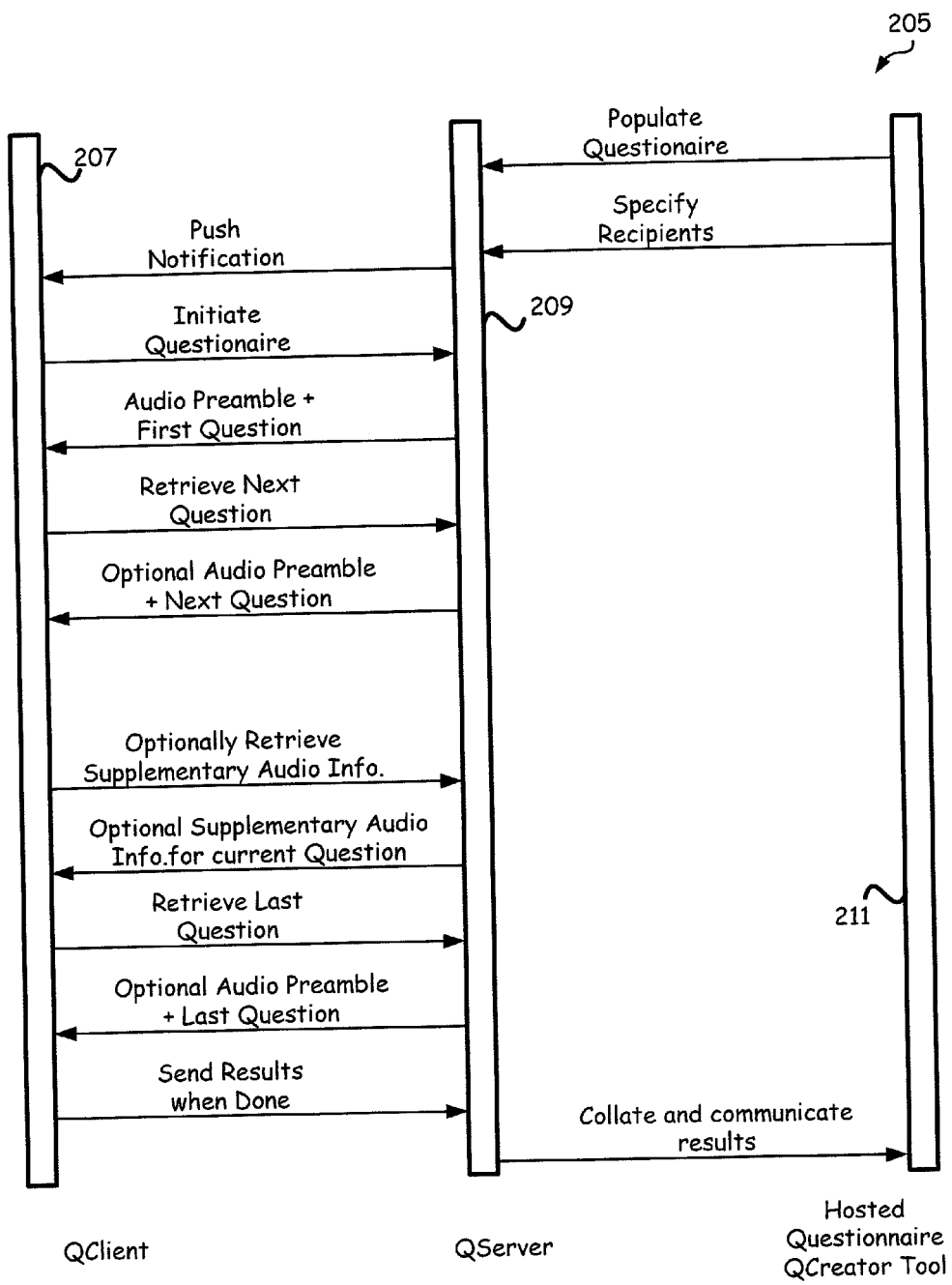
FIG. 2 is an exemplary interaction diagram that depicts generic interactions in the questionnaire network between a QClient in a mobile device, a QServer (that includes a management server) and a QCreator hosted questionnaire (data) population tool that is used to create or assemble questionnaires and surveys.

FIG. 2 is an exemplary interaction diagram that depicts generic interactions in the questionnaire network 205 between a QClient 207 in a mobile device, a QServer 209 (that includes a management server) and a QCreator hosted questionnaire (data) population tool 211 that is used to create or assemble questionnaires and surveys. Typically, a questionnaire is created using the QCreator hosted questionnaire (data) population tool 211 and deposited into a repository QStore associated with the Qserver 209. The questionnaire is then made available for user access (such as by publishing the questionnaire, changing a state associated with the questionnaire, or otherwise managing it, via a management console). After populating a questionnaire during its creation, the QCreator 211 also facilitates the specification of a list of recipients, that is also communicated to and stored in the QServer 209. The QServer 209 translates the list if recipients into useable data, such as phone numbers or IP addresses, as required.

A push notification is sent to a user by the QServer 209, such as by means of an SMS message, an Instant message, an email, etc. User-initiated questionnaire startup is also possible, wherein the user, using his mobile device (with QClient 207) initiates the download and display of a questionnaire from the QServer 209. When a user with the mobile device that receives a push notification uses the QClient 207 to start the questionnaire, the QClient employs the known (or pre-configured) address of the QServer to interact with it. If a session with the QServer is already open, the QClient 207 continues to use it. In one embodiment, the push notification is over SMS and the SMS client (or some other client side software, such as a WAP stack, an HHTP stack, etc.) in the mobile device determines that the notification is targeted towards the QClient 207 and passes the received notification to the QClient 207 for processing. The notification provides information of the questionnaire to be downloaded and/or displayed by the QClient 207. In a related embodiment, the QClient 207 itself is capable of receiving push notification and subsequently initiating the browsing of the questionnaire in the mobile device.

When a questionnaire is initiated for display on a mobile device by the QClient 207, an audio preamble is played, if necessary, on the mobile device 111 (of FIG. 1, using an audio circuitry and/or audio player, such as an MP3 player, etc.). A Questionnaire may have an audio preamble, and a textual preamble. Each question in a questionnaire may also have an audio preamble, and a textual preamble. Typically, when a question is displayed, at least two buttons (or menu items, sometimes more than 2) are also displayed in the bottom of the screen, one an 'Info' button (or menu item) and another a 'Next' button or menu item. When the last question is displayed, the 'Next' button or menu item is replaced by a 'Done' button or menu item. 'Done' would indicate that the questionnaire was completed and the results gathered by the client is communicated to the QServer 117 (of FIG. 1, which may be in carrier network or outside it), which in turn interacts with a billing server, etc. as needed.

Towards the end of the questionnaire, when all the questions have been answered, the results are sent by the QClient 207 in the mobile device 111 to the QServer 209, where they are collated by the QServer 209 and the results are optionally sent to the QCreator tool 211 associated with the questionnaire for retrieval by a user (creator of the questionnaire). Alternatively, the results are sent to the mobile device, such as mobile device 111 that may have initiated the questionnaire creation and/or dissemination. It is also possible for the QServer 209 to be configured in such a way that it retains the results until a consumer of the results subsequently retrieves it.

Figure 3:
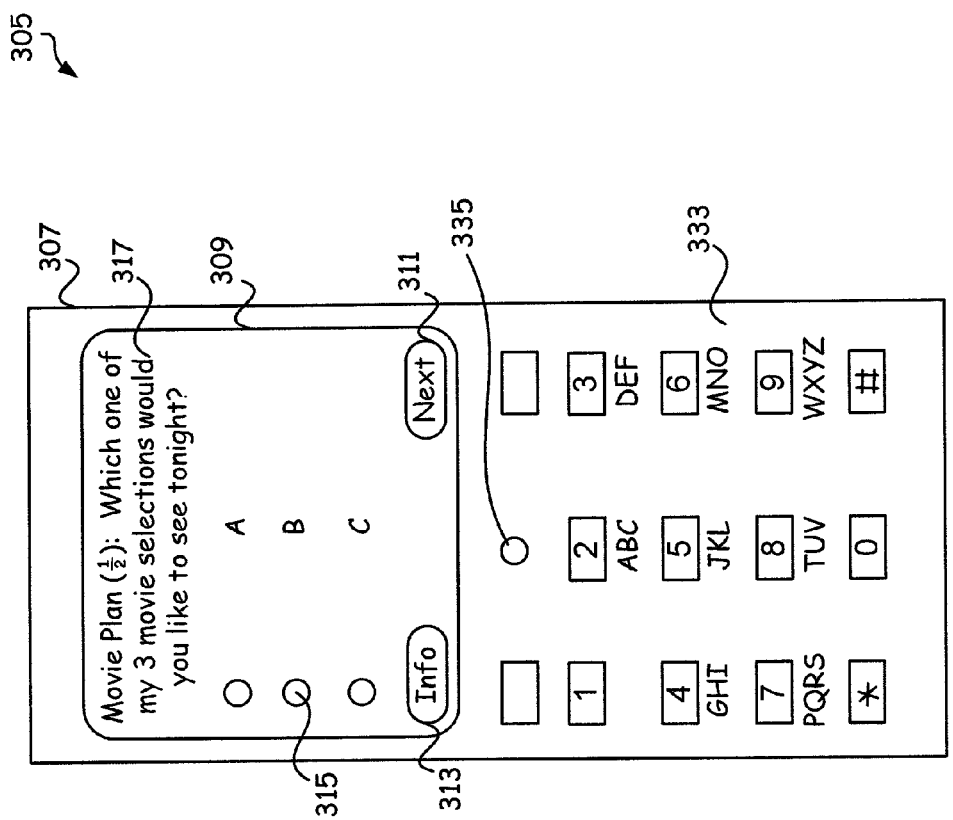
FIG. 3 is an exemplary user interaction screen provided by the QClient component of the mobile device from FIG. 1 that enables a user of the mobile device to review each question and browse through the questions of the questionnaire.

FIG. 3 is an exemplary user interaction screen provided by the QClient component of the mobile device 111 from FIG. 1 that enables a user of the mobile device 307 to review each question and browse through the questions of the questionnaire. In particular, the user has to only use the joystick 335 on the mobile device for selecting an item from a multiple choice provided in any question. The UI screen of the mobile device 307 displays a display frame 309 that is used to display one question at a time for the user. The display frame 309 (which is a dialog box, an IFrame, or a window pane of some sort) is typically used to display the current question (one question at a time), with the option to play the audio preamble of the question by activating the Info menu item (or soft key) 313 (may be an Info button on the keyboard alternatively). It display frame 309 is also used for selecting one or more entries of the multiple-choices presented using the keyboard 333 of the mobile device 307, the joystick 335 or a pen-based input means (not shown), and advancing to the next question in the questionnaire by activating the Next menu item 311 (may be a Next button alternatively). The display frame 309 on the screen is presented and managed by the QClient. It also comprises a personalized textual preamble 317 that is displayed on the top of the multiple-choices of a question that presented to the user. The personalized textual preamble for each question is typically created by a user while using the QCreator for creating/assembling the questionnaire.

The network 105 supports a simple questionnaire hosted (SQH) solution wherein a user employs the hosted QCreator 107 to create a questionnaire for subsequent dissemination. Each user (such as a teenager who wants to invite his friends to a movie) could just create a preamble in voice and a simple textual question using the hosted QCreator 107. The questions would be displayed as illustrated. The user would not have to enter the textual multiple-choice that are typically presented to a recipient (if the user does not want to) to keep the user experience during the creation process simple. The hosted QCreator 107 automatically inserts A, B, C, D as textual multiple choices in a question provided by the user—no descriptive text for the multiple-choices need be provided, as the audio preamble "created" by the user during the creation of each question can provide information on the possible choices, in audio form as part of the preamble. For example, while populating a question using the hosted QCreator 107, the user could just say: "Guys, for tonight's movie, choices are A) Jaws, B) KingKong C) Room with a view. Please pick one." Thus, the description of the multiple choices are incorporated by a user in the audio preamble, thereby making it unnecessary for textual description to repeat those choices. Therefore, a boilerplate set of multiple choice text such as A, B, C and D, wherein they are selectable, can be presented. Personalized textual question/prompt for each question can also be provided by user while creating the questionnaire. The user would also provide list of recipients on an appropriate hosted webpage provided by the hosted QCreator 107. A recipient browsing through the questionnaire would get this customized audio preamble, see customized text preamble, and get a multiple choice (boiler plate) A, B, C to chose from, that are shown in the question frame 309.

Figure 4:
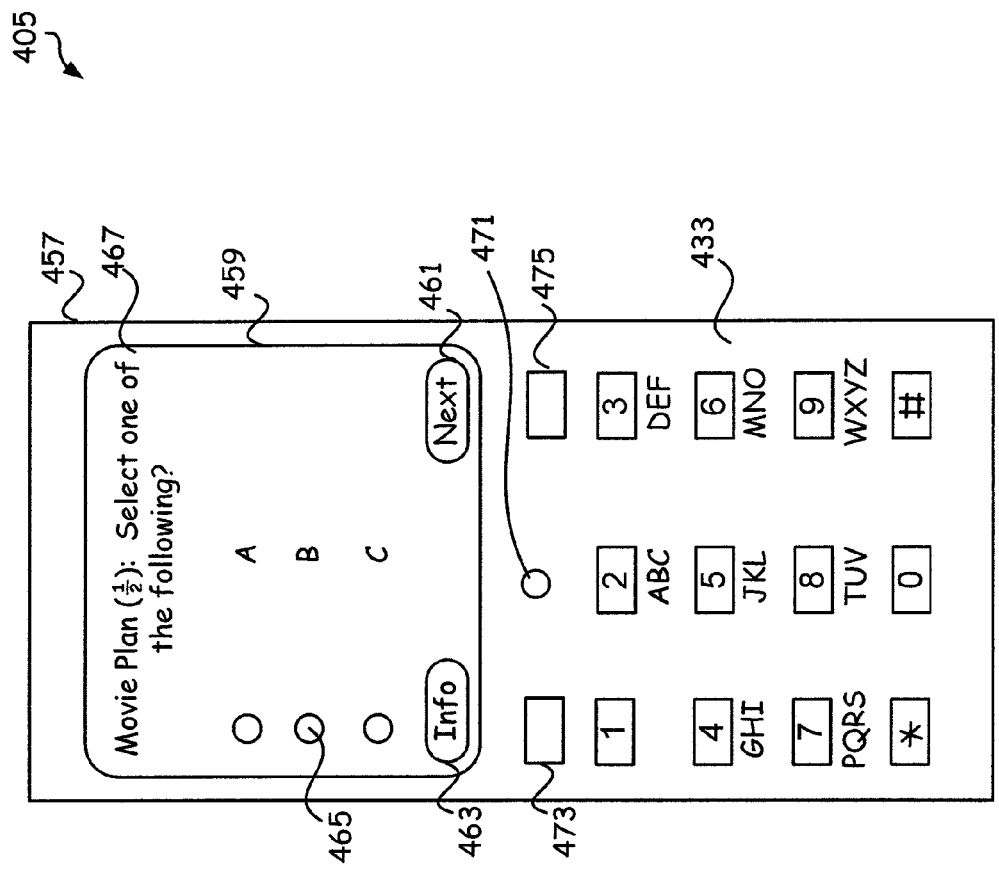
FIG. 4 is another exemplary screen provided by the QClient component of the mobile device from FIG. 1, that enables a user of the mobile device to review each question and browse through the questions of the questionnaire, wherein a generic textual preamble is incorporated into a question along with boiler-plate multiple choice selections.

FIG. 4 is another exemplary screen provided by the QClient component of the mobile device 111 from FIG. 1, that enables a user of the mobile device 433 to review each question and browse through the questions of the questionnaire, wherein a generic textual preamble is incorporated into a question along with boiler-plate multiple choice selections. A recipient would get a question as shown in the question frame 459 of the screen 457, the question typically comprising a customized audio preamble played when the recipient activates the Info menu item, a generic text preamble 467, and a generic multiple-choice 465 with choice A, B, C (or some other choices such as 1, 2, 3, etc.) to chose from. A keyboard 433 is also illustrated that comprises a joystick/selection button 471. An end user recipient does not have to use any other button other than the selection buttons 473 (that manipulates the softkey 463), 475 (that manipulates the softkey 461) and the joystick 471. This makes for a great user experience, by limiting user navigation (user interaction) needs and eliminating keyboard usage for textual data entry or screen manipulation.

The hosted QCreator 107 is used to create the questionnaire that comprises such content (questionnaires, adhoc questionnaires, audio-assisted content, etc) with incorporation of generic question preambles and generic multiple-choice selections into a personalized preamble for each question. For example, a user using the hosted QCreator 107 (such as a teenager who wants to invite his friends to a movie) could just create a preamble with voice (audio) inputs that comprises multiple choices presented in the audio too, and the QCreator automatically inserts textual choices (such as A, B, C, D) in a question. There is no text entered or needed for multiple choices as the user's audio preamble (that is recorded/entered by user) provides information on available choices too. Thus, user could just say: "Guys, for tonight's movie, choices are a) Jaws, B) KingKong C) Room with a View. Pick one". The user would also provide list of recipients on a hosted webpage of the hosted QCreator 107. The textual preamble 367 is a generic one inserted by hosted QCreator 107.

Figure 5:
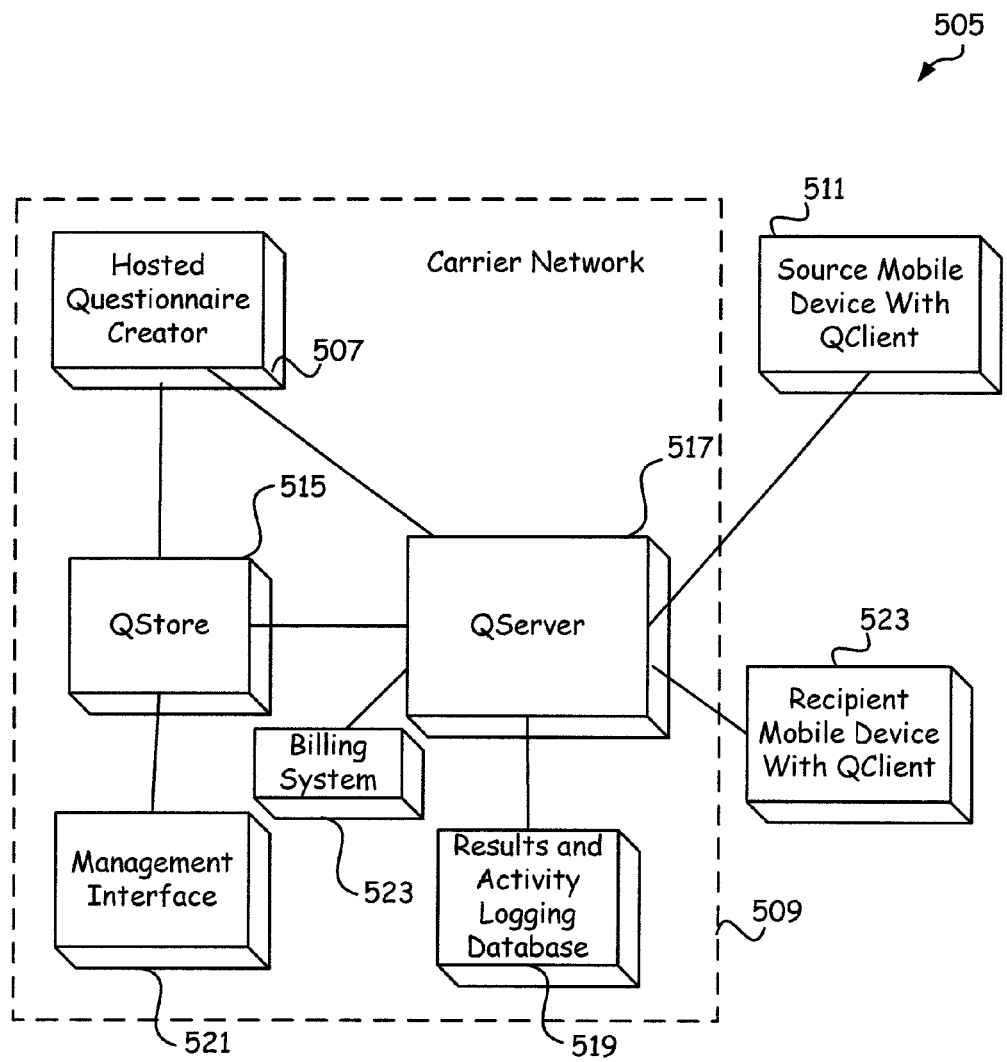
FIG. 5 is an embodiment of FIG. 1 wherein a source mobile device is used by the user to generate an adhoc questionnaire, without providing any textual input (such as textual multiple choices) and providing only an audio content that suffices both as a personalized preamble for a question as well as an enumeration of choices.

FIG. 5 is an embodiment of FIG. 1 wherein a source mobile device 511 is used by the user to generate an adhoc questionnaire, without providing any textual input (such as textual multiple choices) and providing only an audio content that suffices both as a personalized preamble for a question as well as an enumeration of choices. The source mobile device 511 comprises a client component, called QClient, that makes it possible to capture audio preambles for the questionnaires. The user of the source mobile device 511 specifies one or more recipient device, such as recipient mobile device 523, as the target devices to which the questionnaire created by the user should be forwarded or otherwise communicated, and responses sought from. The recipient mobile device 511 also comprises a QClient component that makes it possible to browse through the questions in the questionnaire disseminated to it, one question at a time, playing the audio preambles for the questions when activated by the recipient, and capturing responses to the questions provided by the recipient.

The network 509, such as a carrier network, is capable of processing the received audio portion of the questionnaire (or a single question) and incorporating into it a pre-configured (configured by user) textual preamble and set of abbreviated choices. The carrier network 509 is therefore capable of incorporating into the questions a generic textual prompt along with selectable choices, thus enhancing audio preambles provided by the user creating the questionnaire employing the source mobile device 511. Specifically, the user employs the QClient in the source mobile device 511 to record the audio preambles of one or more questions. These audio preambles not only provide a brief information on the topic of concern (for a current question) but also the audio enumeration of the choices possible. The choices provided by the user in audio form are preferably accompanied by index numbers or reference sequence indicators. The textual component that is generically provided by the QServer 517 comprise of a generic textual preamble and the index numbers or reference sequence indicators (such as for the multiple-choices).

The completely assembled version of the user's questionnaires (that may comprise of multiple questions or a single question) provided by the user is then stored by the QServer 517. A notification of the existence of the questionnaire is sent to the recipients indicated by the user. The list of recipients or a reference to a pre-configured mailing list, or pre-configured list of phone numbers, is retrieved by the QServer 517 if the QClient in the source mobile device 511 does not provide one with the questionnaire. Using such a list of phone numbers or list of recipients, the QServer 517 forwards notifications to the recipient mobile device of the designated recipients. Subsequently when the recipients start the questionnaire, the Qserver 517 provides them with the content of the questionnaire, in sets of N questions at a time, where N is a configurable number.

In one embodiment, the network 509, in which a source mobile device 511 is used by a user to create questionnaires, is also capable of sending the questionnaire to the recipients, i.e. target users specified. The questionnaire is created by user of source mobile device 511 using audio inputs for a questionnaire preamble. The QServer 517 in the network 509 incorporates other generic portions of the questionnaire, with the help of the QCreator 507, if needed. Thus, a user of the source mobile device 511 can make adhoc questionnaires, send them to recipients (on recipient mobile devices, such as recipient mobile device 523) and receive the results. This makes it easy for a user to create, disseminate, conduct questionnaires or surveys on mobile handsets and to collect results for processing and storage. The Qserver 517 collates responses from one or more recipients and reports it back to the sender of the questionnaire, such as a user of a source mobile device 511 who might have created and sent a questionnaire to recipients.

In one embodiment, the QServer 517 is external to the network 509 and is communicatively coupled to the source mobile device 511 and the recipient mobile device 523. It also incorporates a version of the QCreator 507 and a version of the QStore 515.

In one embodiment, the QServer 517, the hosted QCreator 507 and the QStore 515 are all external to the carrier network 509 and the QServer 517 is communicatively coupled to the hosted QCreator 507 and the QStore 515. It is also communicatively coupled to the source mobile device 511 and the recipient mobile device 523.

A management interface 521 communicatively coupled to the QStore 515 makes it possible to an administrator to manage the configuration of the QStore 515, the configuration of the QServer 517, etc. It also facilitates deleting questionnaires, surveys, etc. after they have been disseminated to recipients, deleting them after a period of usage has expired, assigning user groups to specific questionnaires and surveys, etc. Typically, the user who has the rights to create questionnaires using the hosted questionnaire creator 507 also have the rights to manage it using the management interface 521. In one related embodiment, the hosted questionnaire creator 507 is combined with the management interface 521, and the user can not only create but also manage the questionnaires (life cycle management is supported) using the same website/portal.

Figure 6:
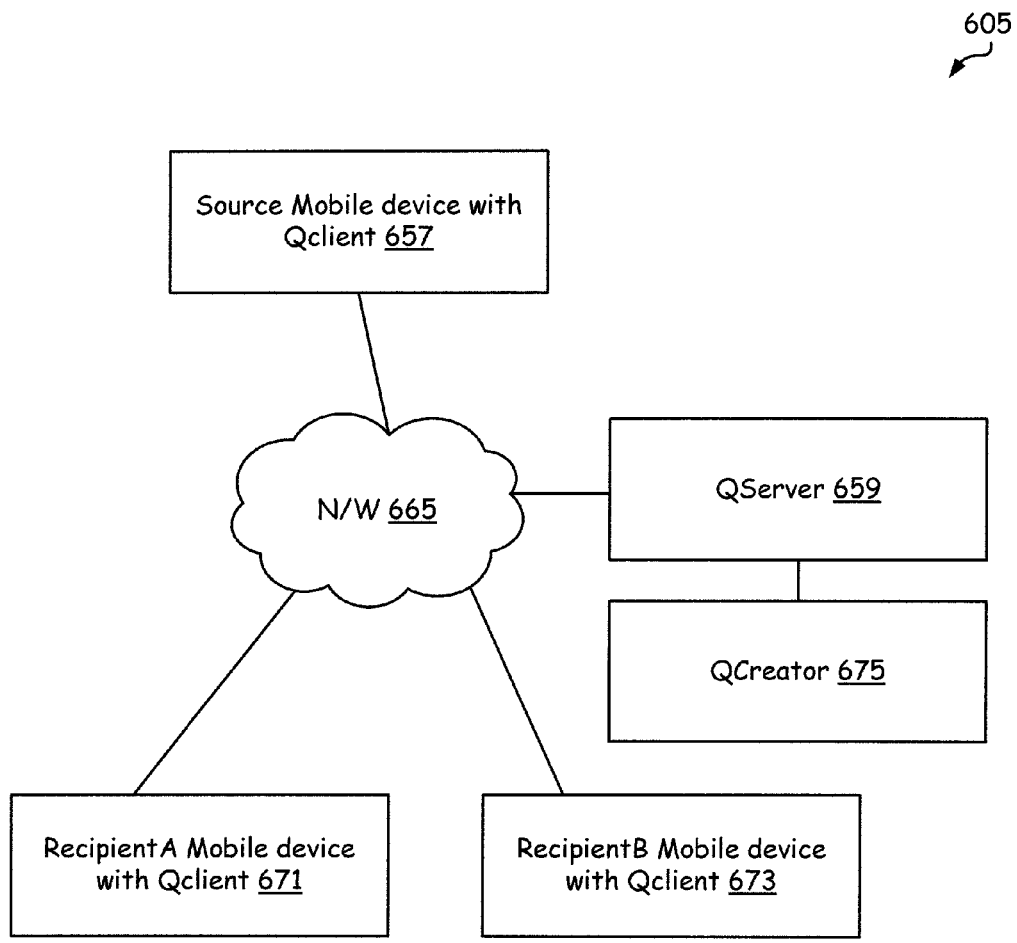
FIG. 6 is a perspective block diagram of a questionnaire network wherein a source mobile device conducts adhoc surveys by sending questionnaires to recipient mobile devices and gets results returned to it immediately after the recipients complete the questionnaires.

FIG. 6 is a perspective block diagram of a questionnaire network 605 wherein a source mobile device 657 conducts adhoc surveys by sending questionnaires to recipient mobile devices 671 and 673, and gets results returned to it immediately after the recipients complete the questionnaires. Each of the recipient mobile devices 671, 673 comprise at least a portion of the QClient component that supports browsing through the questionnaire one question at a time, and answering each question. The source mobile device 657 comprises at least a portion of the QClient component that supports the creation of at least a portion of a questionnaire locally in the source mobile device 657 and the communication of the created at least a portion of a questionnaire to a QServer 659 over a network 665 for completion of any parts of the questionnaire that might be missing or have a placeholder, and for storage. Thus, the source mobile device 657 and the recipient mobile devices 671 and 673 each comprise at least a portion of the QClient (the necessary components), though not necessarily the same portion. Thus, in general, the QClient software not only supports questionnaire creation (such as adhoc questionnaires) but also browsing through received questionnaires (that may have been created using a PC, using a mobile device or a hosted Questionnaire creation server).

The network 665 is a wireless and/or wired network, cellular network such as 3G, UMTS, CMDA, GSM, etc., a WLAN network, or a WiMAX network, Internet, Bluetooth, IrDA, etc. The network 665 provides connectivity between the source mobile devices, the recipient mobile devices, the server Qserver 659 used to manage the questionnaires, and the server/component QCreator 675 used to create questionnaires (remotely).

The QServer 659 is responsible for disseminating questionnaires to the recipient mobile devices 671, 673. To do so, it primarily interacts with the QClient's in the recipient mobile devices 671, 673. It is also responsible for receiving completed questionnaires from the hosted QCreator systems 675. It receives partially created questionnaires (with audio portions such as preambles provided and minimal or no textual content) from QClient's of the source mobile devices 657, processes them, sends them to the QCreator 675 for incorporation of generic preambles and generic multiple-choice portions where needed, and stores the updated questionnaires (if necessary). It also distributes the updated questionnaires (updated with boiler plate/generic textual preambles and multiple choice portions) to the recipient mobile devices 671, 673 based on pre-configured list of recipients (that may be stored in the QServer 659, for example) or based on a target list of recipients provided by the source mobile device 657. It is capable of converting a list of recipients provided by the source mobile device 657 into a list of phone numbers of the recipient mobile devices, a list of IP addresses of the recipient mobile devices, etc.

Figure 7:
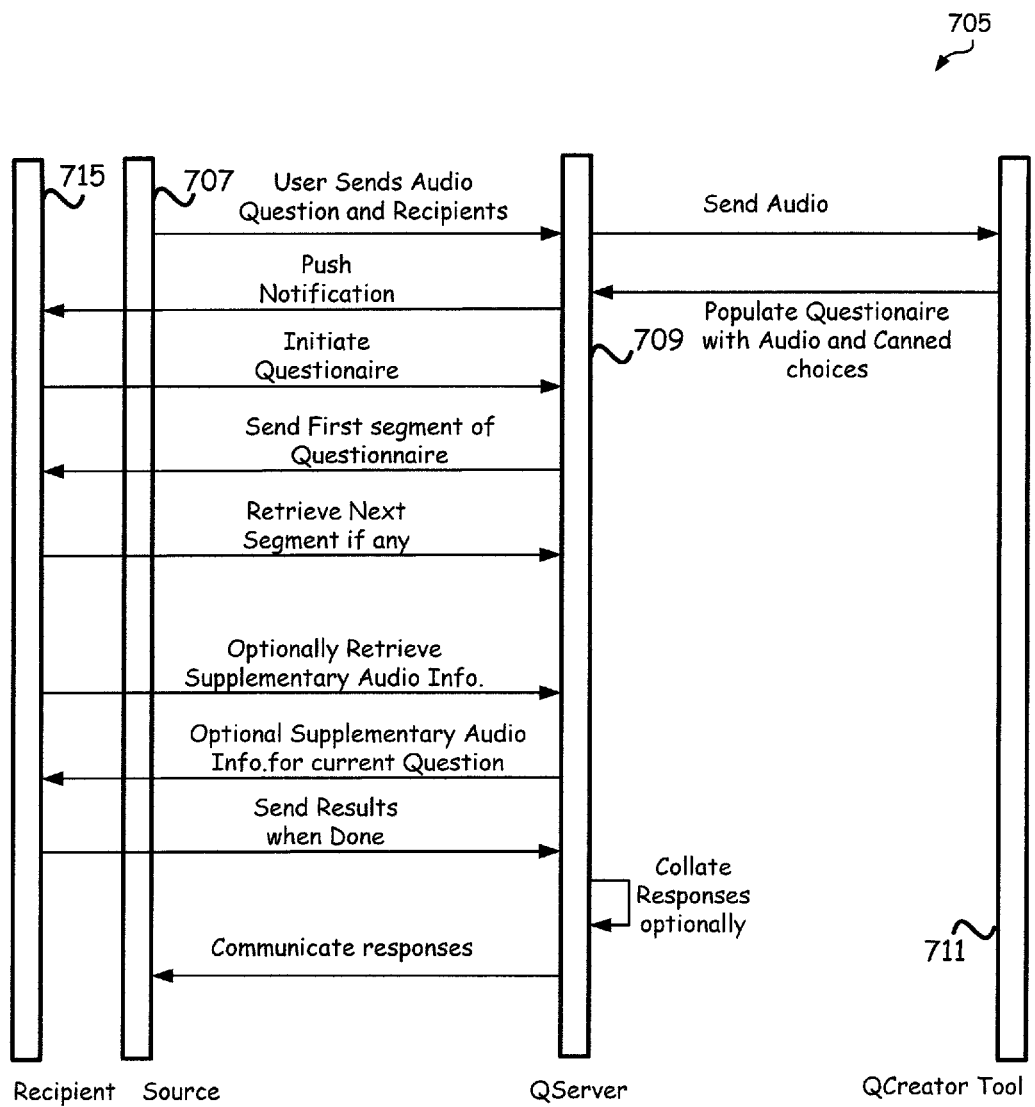
FIG. 7 is an interaction diagram showing exemplary interaction between a source mobile device and a recipient mobile device wherein the source mobile creates an ad-hoc questionnaire that a Qserver enhances by incorporating generic preambles and multiple-choice portions to questions.

FIG. 7 is an interaction diagram showing exemplary interaction between a source mobile device 707 (657 of FIG. 6) and a recipient mobile device 715 (671 of FIG. 6) wherein the source mobile 657 creates an ad-hoc questionnaire that a Qserver 709 (659 of FIG. 6) enhances by incorporating generic preambles and multiple-choice portions to questions. The mobile devices 657 and 671 comprise the QClient component that facilitates creation of questionnaires and browsing through any questionnaires received. The user of the source mobile device 657 initially sends audio portions of questions and a list of recipients to the QServer 659. The QServer 659 then forwards the audio portion(s) to a QCreator 711 (675 of FIG. 6) to get the questionnaire populated and generic textual content and generic multiple choices (canned choices) inserted for the questions in the questionnaire. The QCreator 711 also inserts a generic questionnaire preamble, in audio form and/or textual form, if necessary. The QServer 659 receives the updated questionnaire from the QCreator 675 and stores it if needed (temporarily or permanently).

Then, the QServer 659 sends a push notification to the recipient devices such as recipient mobile device 671. In response, the QClient in the recipient mobile device 671 initiates the browsing of the questionnaire starting with the first question. The QServer 659 sends the first segment of the questionnaire, which may comprise of a set of questions, to the recipient mobile device 671. When the recipient answers the questions of the first segment and the QClient in the recipient mobile device 671 retrieves the next segment, if any. In addition, for any question, the recipient has the option to retrieve supplementary information, which may be provided as audio supplementary information, textual supplementary information or a combination of both. Providing video supplementary information, graphics, streaming audio or MPEG 4 content are also contemplated.

When the recipient has completed the questionnaire on the recipient mobile device 671, the results are sent to the QServer 659, which collates all such results and finally communicates the results to the source mobile device 657.

In one embodiment, when each segment of the questionnaire is completed, the QClient component in the source mobile device 657 sends the partial responses received to the QServer 659. In a different embodiment, the QServer sends the entire questionnaire to the QClient of the recipient mobile device 671, in one chunk, rather than send one segment at a time.

Figure 8:
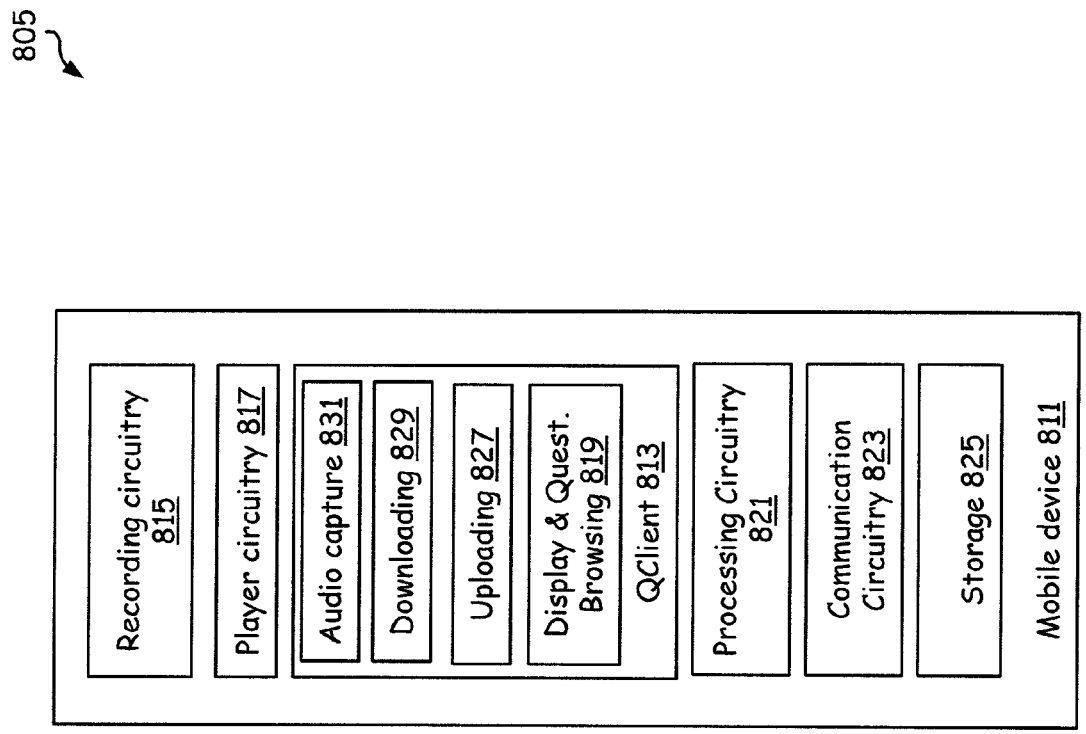
FIG. 8 is a perspective block diagram of a mobile device that is capable of creating questionnaires with audio preambles, uploading them to a server for dissemination, as well as capable of receiving questionnaires and facilitating the browsing of the downloaded questionnaire by a user.

FIG. 8 is a perspective block diagram of a mobile device 811 that is capable of creating questionnaires with audio preambles, uploading them to a server for dissemination, as well as capable of receiving questionnaires and facilitating the browsing of the downloaded questionnaire by a user. The mobile device 811 comprises a recording circuitry 815, player circuitry 817, communication circuitry 823, processing circuitry 821, and storage 825. The mobile device also comprises a client component 813 for questionnaires, called QClient 813 that employs the recording circuitry to record audio preambles for questionnaires when the user is creating a questionnaire, and a player circuitry 817 to play audio preambles in questionnaires while the user is responding to questionnaires received. The mobile device 811 is communicatively coupled to a remote server called Qserver using the communication circuitry 823.

The Qclient 813 comprises an audio capture component 831, a downloading component 829, an uploading component 827 and a questionnaire display and browsing component 819. The audio capture component 831 employs the recording circuitry 815 for recording voice—typically used in question preambles and questionnaire preambles. The downloading component 829 is used to download questionnaires from the Qserver. The uploading component 827 employs the communication circuitry 823 to upload questionnares (or partial questionnaires) created in the mobile device 811. The questionnaire display and browsing component 819 makes it possible to display (for interaction by a user) a downloaded questionnaire to which a user can provide responses after reading/browsing using the QClient 813.

The recording circuitry 815 facilitates the recording of an audio portion of a questionnaire when activated. Questionnaires are communicated to a Qserver (when the questionnaire is ready and user initiates an upload) along with a recipient list that is stored in the storage 825. The processing circuitry 821 facilitates the communication, of questionnaires created or responses to questionnaires received, using the communication circuitry 823. The questionnaires created are communicated to the Qserver for forwarding the questionnaire to users associated with the recipient list. The QClient 813 comprises the questionnaire display & browsing component 819 that makes it possible for a user to browse through all the questions of a questionnaire, one question at a time, with support for playing audio preambles, if needed, and displaying supplementary text information or playing supplementary audio information, when requested by user.

In one embodiment, the recording circuitry 815 is capable of recording not only audio but video information too, such as in MPEG 4 formats. The player circuitry is capable of playing audio information (audio preambles) but also video content associated with the preamble of a question of a questionnaire.

Figure 9:
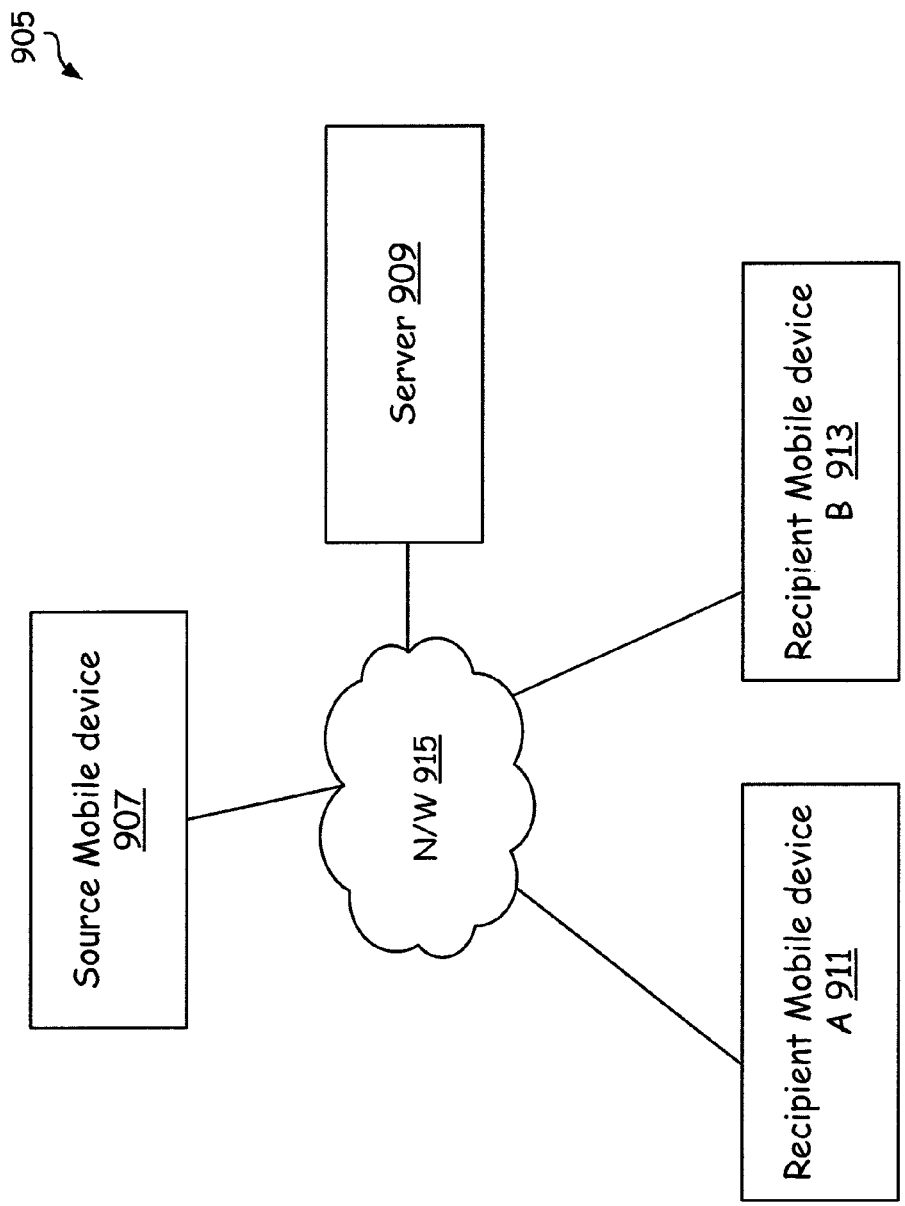
FIG. 9 is another perspective block diagram of the cellular network infrastructure of FIG. 6 for mobile devices that facilitates creation and dissemination of questionnaires from a source mobile device to a plurality of other recipient mobile devices.

FIG. 9 is another perspective block diagram of the cellular network infrastructure of FIG. 6 for mobile devices that facilitates creation and dissemination of questionnaires from a source mobile device 907 to a plurality of other recipient mobile devices 911, 913. The source mobile device 907 captures questions (in audio form) from a user and sends it to a server 909 to convert it into a complete questionnaire that is sent to designated recipients. The recipients use their respective recipient mobile devices 911, 913 for browsing through the questionnaire when they receive it. The server 909 receives the results from the recipient devices 911, 913 and forwards them to the source mobile device 907.

The server 909 is capable of converting recipient list to a list of phone numbers or IP addresses as needed, in order to communicate the questionnaires, or a notification regarding the questionnaire, to the recipient mobile devices 911, 913. The server 909 is capable of completing the incomplete questionnaires received from the source mobile device 907. For example, the source mobile device 907 may send an incomplete questionnaire with two questions, each with only the audio preamble created (by a user recording the questions in audio form that incorporates a brief descriptions of available choices) and the server 909 incorporates a generic textual preamble and a generic set of multiple choices for each question in order to complete the questionnaire. For example, if the user creating the questionnaire on the source mobile device 907 provided two questions such as "Which movie do you want to go? a) Jaws b) Sideways c) Room with a view" and "Where do you want to eat after the movie? a) Freds, b) Baja Fresh c) That This", then the server 909 would incorporate into the received "partially complete" questionnaire a generic textual preamble (also called prompt sometimes), such as "Select one of the following:", and a generic multiple choice set, such as ">A, >B, >C", for each question received in the questionnaire.

The server 909 receives audio question from a user, incorporates multiple-choice text, and generic prompt to user, and sends questionnaire to recipients. The recipients are either specified by the user along with the questionnaire or pre-configured and stored in the server 909 to be used to forward questionnaires. It then receives responses, and sends them to source mobile device 907. Responses are either sent individually as they are received or collated and sent in one set back to the source mobile device 907. Additionally, it is possible to configure the server 909 to save the responses until they are retrieved by the source mobile device 907.

The recipient mobile device 911, 913 receives question/questionnaire, lets the recipient user browse through each question and answer them (i.e. respond to them), and sends results to server 909. Results may be communicated to the server at the end of the questionnaire or at the end of each segment of the questionnaire (where the questionnaire is segmented into multiple sets of N questions each, where N could be a number such as 5, or even a 1 in the degenerate case).

The server 909 also supports the notification of the availability of the questionnaire and the dissemination of questionnaires to the mobile device 911. The user interaction is facilitated by a client component in the mobile device 911, which is either made available by the manufacturer of the mobile handsets or subsequently downloaded over the air, or otherwise installed by the user. The client component is able to process the received questionnaire (or portions thereof), playing audio portions such as audio preambles, audio supplementary information, etc. and displaying textual preambles and textual multiple-choice sets.

In one embodiment, the network 905 comprises mobile devices 907, 911, 913 which are a devices such as of cellular phones, PDAs, converged devices, etc. and the network is 915 is a wireless and/or wired network, cellular network such as 3G, UMTS, CMDA, GSM, etc., a WLAN network, or a WiMAX network, Internet, Bluetooth, IrDA, etc.

Figure 10:
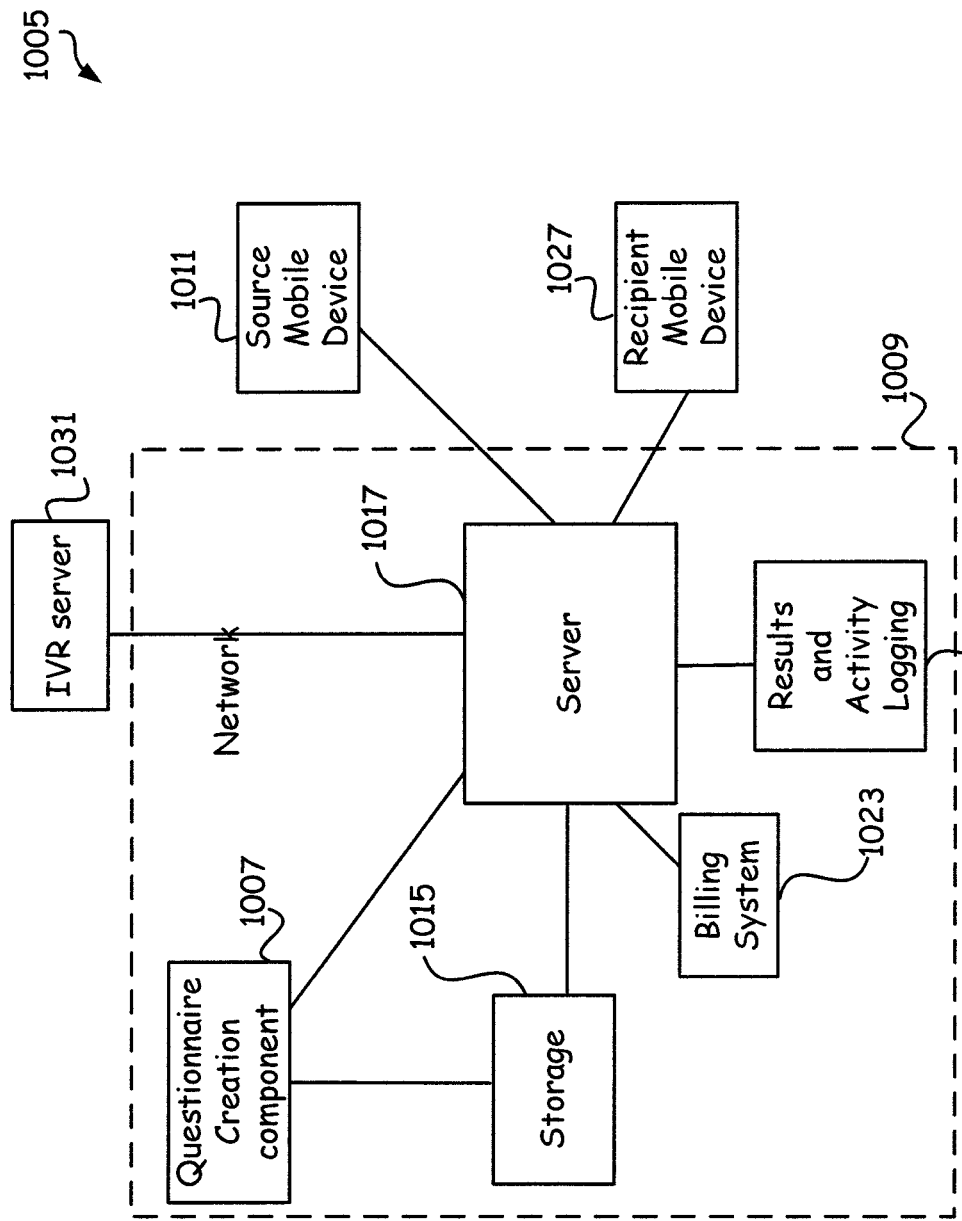
FIG. 10 is a perspective block diagram of a network that supports adhoc questionnaire creation by a user of a mobile device that is forwarded to recipient users who respond to the questionnaire, wherein the results are routed back to the mobile device.

FIG. 10 is a perspective block diagram of a network 1005 that supports adhoc questionnaire creation by a user of a mobile device that is forwarded to recipient users who respond to the questionnaire, wherein the results are routed back to the mobile device. The network infrastructure 1005, such as a cellular network infrastructure, a WiMAX infrastructure, etc. comprises a source mobile device 1011 that a user uses to create adhoc questionnaires, a server 1017 that receives the questionnaires and sends them to one or more recipient mobile devices 1027, a questionnaire creation component 1007 that facilitates questionnaire creation using a remote computer (not shown) or via the server 1017, a storage 1015 that is used to store questionnaires if necessary, and a results and activity logging component 1019 that can be used to track questionnaire creation, questionnaire answering, and other related activities. The cellular network infrastructure 1005 also comprises a billing system 1023 that can facilitate billing for the creation of questionnaires, the distribution of questionnaires, etc.

Adhoc questionnaire creation, such as creation of a single question typically, is also supported in the source mobile device 1011. The source mobile device comprises a client that supports questionnaire creation (even a partial questionnaire that can later be completed by the server 1017). A user with the client in the source mobile device 1011 creates an ad-hoc question/questionnaire on the fly, that typically comprises of only a question captured in audio form, and sends the audio question to specific recipients or to a pre-configured recipient list or mailing-list. The user then receives responses (such as one of a multiple-choice A, B, C or D for each question) from one or more recipients on the source mobile device 1011.

In one embodiment, the user of the source mobile device 1011 does the following to create an adhoc questionnaire and receive results: a) Activates recording on source mobile device 1011 (such as activating a record button on the source mobile device 1011, activating a different button, or even a displayed menu item); b) User speaks into source mobile device 1011 in order to record a question (captured as a question preamble); c) User stops recording a question; d) User records audio component for additional questions if needed, repeating steps a) through c); e) User terminates audio inputs for adhoc questionnaire; d) User provide recipient list (a single phone number, a list of phone numbers, a list of contacts from the contact list, a preconfigured recipient list, or a mailing list); and f) User waits for responses and reviews it when received.

The source mobile device 1011 (i.e. the client) would do the rest—formulating question based on audio input (which is called Question preamble). Then source mobile device 211 ships the questionnaire to server 1017 with a recipient list. Server 1017 farms out question to recipients, receives responses (from one or more recipients) and forwards the responses/result to the user on the source mobile device 1011.

In one embodiment, questionnaire creation component 1007 is a hosted server that can be used by the source mobile device 1011 to create questionnaires. In a related embodiment, the questionnaire creation component 1007 is part of the server 1017 and provides questionnaire creation logic useful for the completion of a partially assembled questionnaire sent by the source mobile device 1011. For example, if the source mobile device 1011 sends a questionnaire with only audio preambles recorded using the source mobile device 1011, the questionnaire creation component 1007 is used by the server 1017 to incorporate a generic question preamble, a generic multiple-choice set, etc. into each question of the partially complete questionnaire. In a different embodiment, the questionnaire creation component 1007 is part of (incorporated into) the server 1017.

In one embodiment, the questionnaire preamble is not created by the user populating the questionnaire. The questionnaire creation component 1007 does not add a questionnaire preamble, instead it adds textual questionnaire preamble to each question. Each question comprises a textual question preamble incorporated automatically by the questionnaire creation component 1007. Other components of a questionnaire, such as supplementary information, graphic images, etc. are also selectively incorporated by the questionnaire creation component 1007 when they are missing from a questionnaire communicated by the source mobile device 1011.

When a recipient using the recipient mobile device 1027 gets the questionnaire on his recipient mobile device 1027, the questions themselves are provided to the recipient by the server 1017, starting with the first one, without the preamble of the questionnaire if it does not exist. Thus, in the beginning of the questionnaire, the recipient would view the first question (or just the multiple-choices for it) and would be able activate an Info menu item to hear the audio preamble for the first question. The recipient selects one of the automatically incorporated multiple-choices presented, using a joystick for selection of a choice, or using a selection button or softkey. For example, a multiple choice of A, B, C or D is presented to the user for the question, and the user selects one of them using the joystick/selection mechanism (after scrolling to the right choice using the joystick, for example). In a related embodiment, the recipient selects one of the automatically incorporated multiple-choices presented, such as A, D, G, or J, say, by selecting D on the keyboard. In another related embodiment, the choices presented to user are 2, 3, 4, 5 (corresponding to adjacent keys on a typical mobile phone keyboard) and the user selects one of them on the recipient mobile device keyboard, before activating the Next menu item to proceed to the next question, if any.

In one embodiment, the recipient device is a legacy device 1027 and not capable of letting a recipient user work through the questionnaires. For such a device, the server 1017 sends a voice mail notification to the recipient device 1027 and when triggered by the recipient device 1027, causes the audio preamble of the questions to be played as voice mail, such as those that employ interactive voice response (IVR) system 1031. The user is provided with the option to select from the generic set of multiple choices (1, 2 3 or 4) and the user selections are noted through the IVR system 1031. Thus, part of the questionnaire, the audio preamble with references to the choices available, is played as part of a voice mail and the recipient's choices are recorded by means of IVR and the collated results are forwarded to the user of the source mobile device 1011. Such a solution wherein IVR is used makes it possible to incorporate "legacy" devices and land line devices into the network 1005 and have them participate in receiving questionnaires and responding to them. The server 1017 thus employs the services of an IVR system 1031 to provide questionnaires to recipients on legacy devices (and other devices that do not have an appropriate client software installed) in order to solicit user responses to the questions in the questionnaire. Such responses received via the IVR system 1031 are also collated and results are sent to the source mobile device 1011.

In one embodiment, the source device is a legacy device 1011 (such as a landline telephone or older model of mobile devices) and not capable of letting a recipient user create questionnaire by recording questions in the source device 1011. For such a legacy device, the server 1017 supports recording questions by providing an interface to an IVR system 1031 that guides the user of the legacy device 1011 to create a questionnaire. The IVR system 1031 is responsible for providing tones, voice prompts, recording and DTMF recognition to the network 1009, especially for questionnaire services accessed by a user using the source mobile device 1011 and the recipient mobile device 1027. The server 1017 then sends a voice mail notification (or any other type of notifications such as SMS, etc.) to the recipient device 1027 and when triggered by the recipient device 1027, causes the audio preamble of the questions to be played as voice mail, such as those that employ interactive voice response (IVR) systems 1031. On the other hand, if the recipient devices 1027 are capable of listening to audio preambles of a questionnaire, then the questionnaire is sent with audio preambles.

In one embodiment, the server 1017 is capable of determining if the source mobile device 1011 requires the support of an IVR server 1031 (IVR functionality support, in general). If it determines that it does, then it makes the IVR server 1031 available for the source mobile device 1011 to record portions of the questions during questionnaire creation. Similarly, the server 1017 is capable of determining if the recipient mobile device 1027 requires the support of an IVR server 1031 to respond to the questionnaire. If it determines that it does, then it makes the IVR server 1031 available for the recipient mobile device 1011 to play portions of the questions and to solicit input (responses) from the user. The server 1017 then forwards the responses to the source mobile device 1011. The server 1017 is also capable of receiving audio preambles from the source mobile device 1011 (from those that can record audio preambles of questions) and communicating it to the IVR server 1031, if necessary, such as when a legacy recipient device 1027 needs support to enable the user to listen to the audio portions and respond to the questions of a questionnaire. Although the IVR server 1031 is shown to be external to the network 1009, and communicatively coupled to the server 1017, it should be understood that this is just one embodiment, and other embodiments wherein the IVR server 1031 is within the network 100, or combined with the server 1017, are also contemplated.

Figure 11:
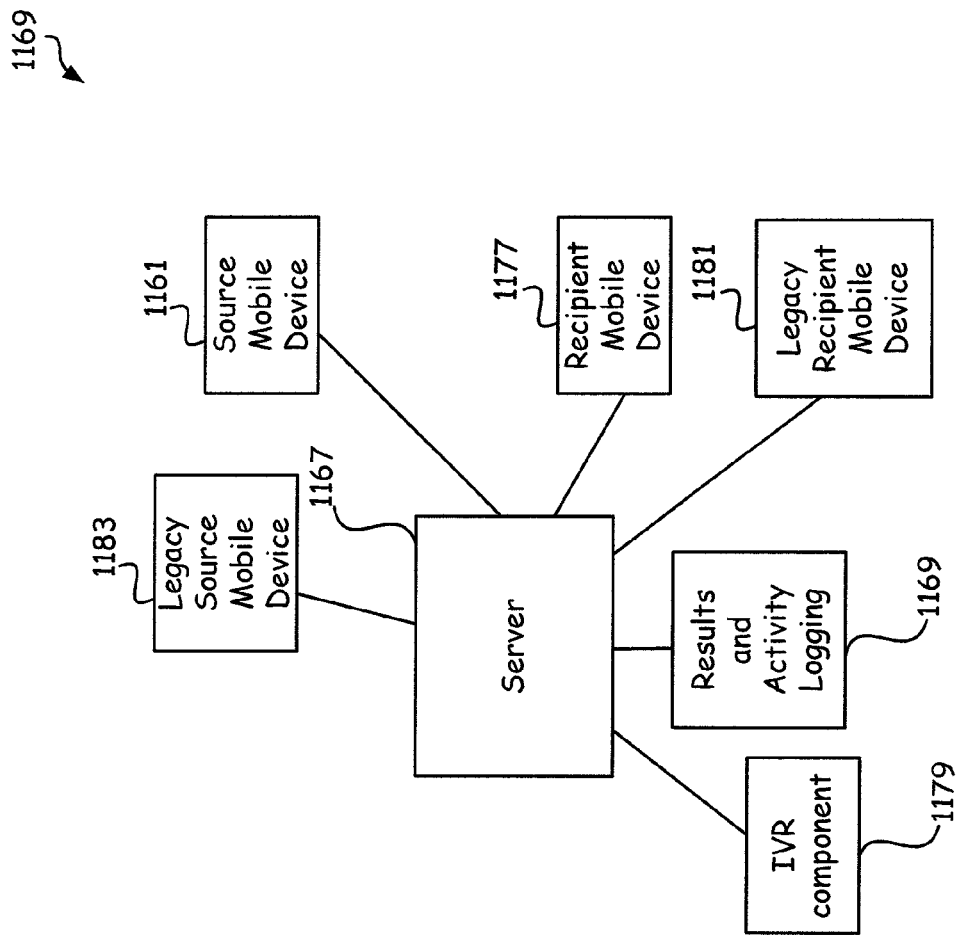
FIG. 11 is a perspective block diagram of a network wherein an IVR (Interactive Voice Response) component supports playing of audio preambles for legacy recipient devices that cannot play audio portions of a questionnaire, such as audio preambles to the individual questions.

FIG. 11 is a perspective block diagram of a network 1169 wherein an IVR (Interactive Voice Response) component 1179 supports playing of audio preambles for legacy recipient devices 1181 that cannot play audio portions of a questionnaire, such as audio preambles to the individual questions. The network 1169 comprises the source mobile device 1161 that is capable of creating questionnaires without help from the IVR component 1179 and the recipient mobile device 1177 that can be used by a recipient to respond to the questionnaires without the help of the IVR component 1179. The network 1169 also comprises the legacy source mobile device 1183 that is incapable of creating questionnaires without help from the IVR component 1179 and the legacy recipient mobile device 1181 that can be used by a recipient to respond to the questionnaires using the help of the IVR component 1179. The server 1167 makes the services of the IVR component 1179 available for any devices that need its services either to create questionnaires or to respond to questionnaires. Although a legacy device is presumed to need the services of the IVR component 1179, its services are made available to new devices too that are incapable of either playing audio preambles or incapable of recording audio preambles. The results and activity logging component 1169 keeps track of the usage of the IVR component 1179, as it also keeps track of the creation and dissemination of questionnaires.

Figure 12:
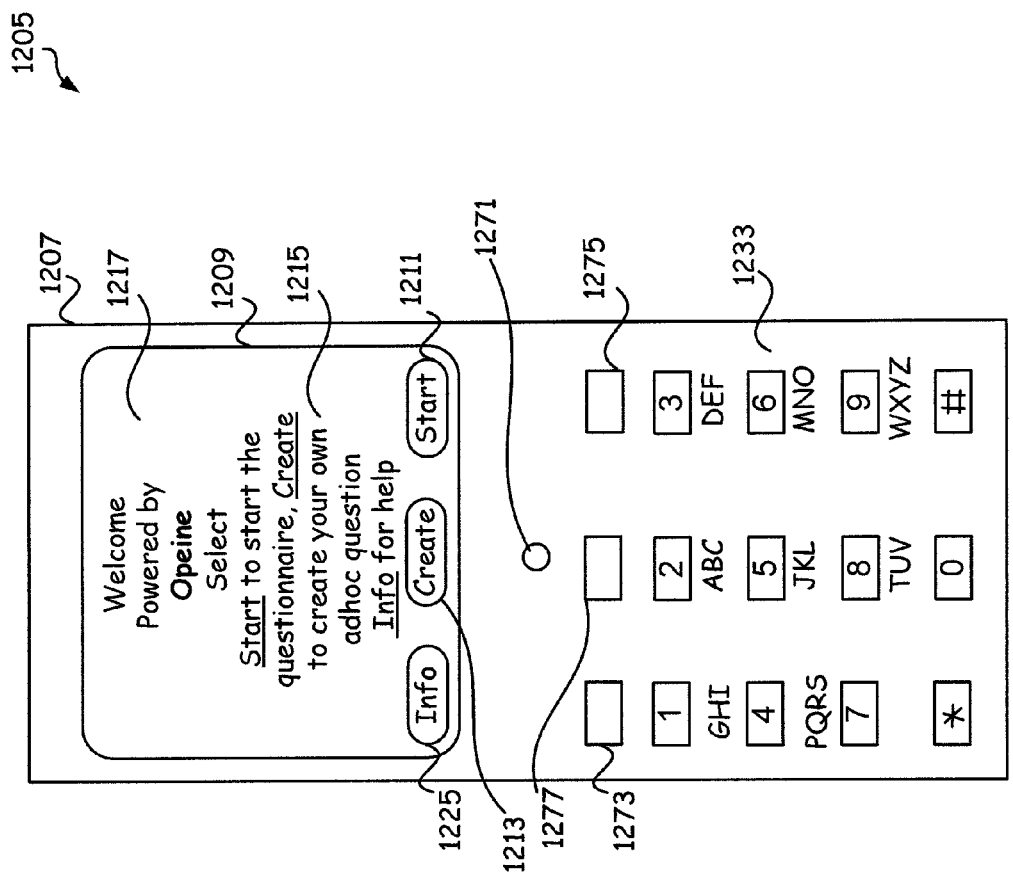
FIG. 12 is an exemplary main splash screen for a mobile device that supports adhoc creation of questionnaires and browsing through a questionnaire from the mobile device.

FIG. 12 is an exemplary main splash screen 1209 for a mobile device 1207 that supports adhoc creation of questionnaires and browsing through a questionnaire from the mobile device 1207. The main splash screen 1209 provides a welcome message 1217, a textual preamble for the questionnaire 1215 that informs a user on the behavior to anticipate when menu-items are selected. It also provides menu items such as a Start 1211, an Info 1225 and Create 1213 with associated softkeys. A soft key is a button, located along a display device, which performs whatever function (Info, Create and Start menu item in this case) is shown near it on that display. The selectable menu items 1211, 1213 and 1225 are activated by softkeys typically, and may be replaced by buttons on the keyboard (hardkeys) that provide similar behavior when activated. A typical mobile phone has a softkey located at left (LSK) 1273, right(RSK) 1275 and center(CSK) 1277. Depending on modality of application, various functions can be mapped on it, such as Information 1225, Start 1212 and Create 1213. It will bring multiple function which is a pop-up expanded menu from bottom. Soft key itself is usually not printed with a functional icon or text but often marked with a dot or short bar.

The user can branch to recording adhoc questions by selecting Create from the menu items 1213, such as by activating the softkey 1277. The user can also branch to reviewing of a questionnaire or answering a questionnaire by activating the Start entry from the menu items 1211, such as by activating the softkey 1275. Thus, this main screen supports the activation of adhoc questionnaire creation or the display of a received questionnaire soliciting user response to the questions.

In one embodiment, the main splash screen 1209 does not display any questionnaire preamble 1215. In a related embodiment, the text 1215 displayed in the main splash screen 1209 is a generic help text and the textual preamble for the questionnaire is displayed when the user selects the Start menu item 1211 (for example, by activating the softkey 1275) and the next screen is displayed.

Figure 13:
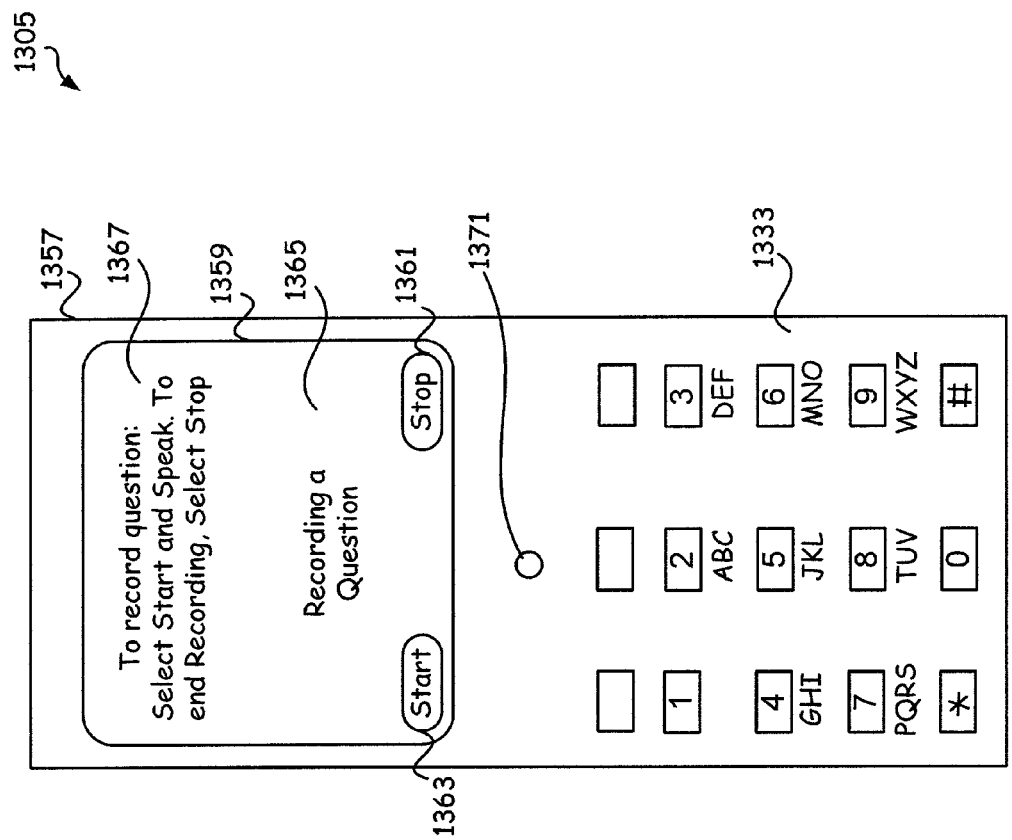
FIG. 13 is an exemplary adhoc questionnaire recording screen that is displayed on a mobile device when the Create menu item is activated from the screen described in FIG. 12.

FIG. 13 is an exemplary adhoc questionnaire recording screen that is displayed on a mobile device 1357 when the Create menu item is activated from the screen described in FIG. 12. The Create functionality can be invoked, for example, by means of a softkey associated with it. In response, a screen that supports recording is displayed, which provides a Start and Stop recording feature, by means of a Start 1363 menu item/softkey and a Stop 1361 menu item/softkey. The user can start recording a question by activating Start menu item (or corresponding hard key/button, if any) 1363, then Stop the recording by activating Stop menu item (or button, if any) 1361. The user can also record the audio input for more than one question, one question at a time.

Figure 14:
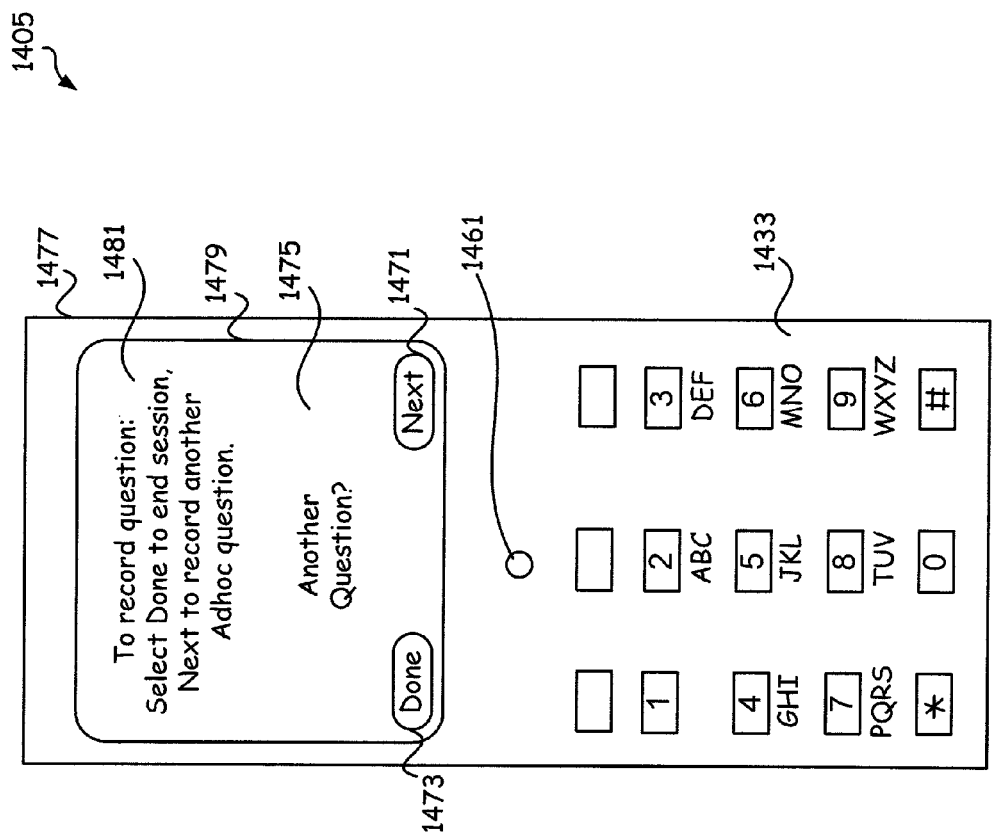
FIG. 14 is an exemplary adhoc questionnaire recording screen that is displayed when the user Stops recording the audio portions, such as an audio preamble, for a given question while creating a questionnaire, and the user is provided an opportunity to record a new/next question.

FIG. 14 is an exemplary adhoc questionnaire recording screen 1479 that is displayed when the user Stops recording the audio portions, such as an audio preamble, for a given question while creating a questionnaire, and the user is provided an opportunity to record a new/next question. When the user activates the Stop menu item 1361 in described in FIG. 13, the screen 1479 shown in FIG. 14 is displayed to the user. Thus, after a question has been recorded by a user, the menu item Stop 1361, when activated, changes to menu item/softkey Next 1471, to make it possible to record another question by user. In addition, the menu item Start 1363 changes into menu item Done 1473, to let the user terminate the questionnaire creation, if necessary. An appropriate message 1481 is displayed to inform the user of the actions he can take. In one embodiment, the user can re-record an audio preamble, replay the audio preamble recorded, or delete the audio preamble recorded, with appropriate menu items/softkeys provided for those actions.

Figure 15:
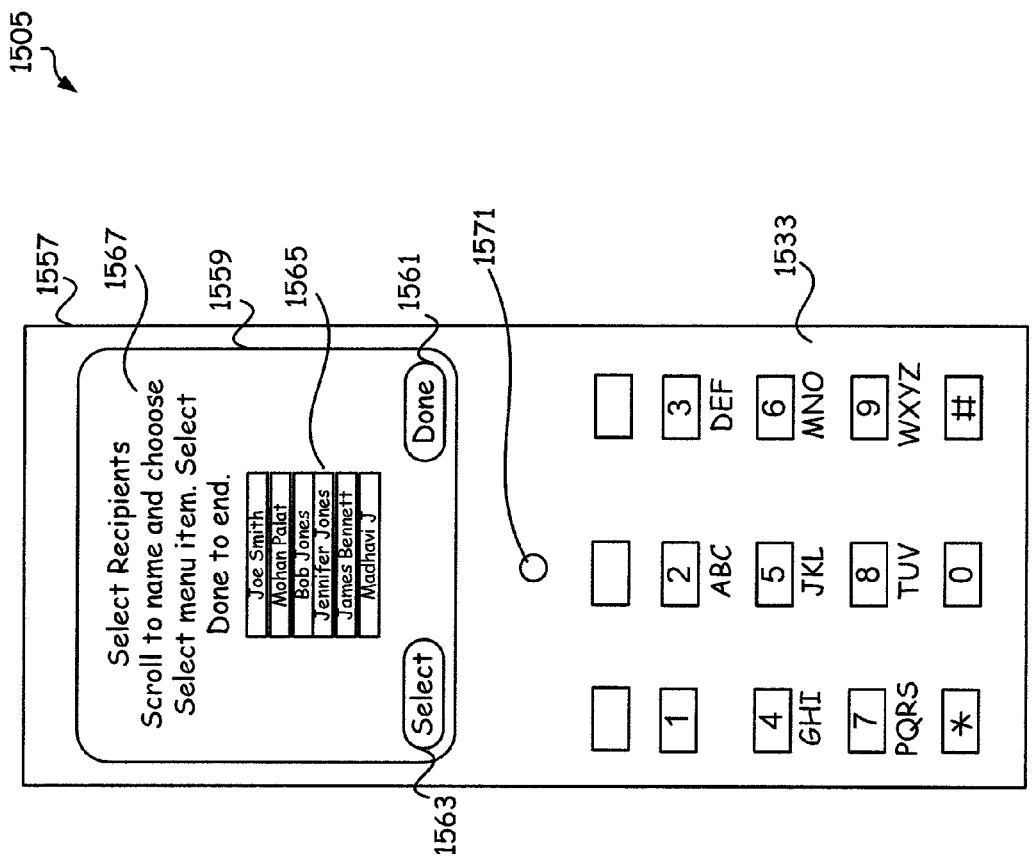
FIG. 15 is an exemplary recipient selection screen provided by a mobile device wherein a user is prompted to select one or more recipients that are to receive the questionnaire currently populated in the previous screens.

FIG. 15 is an exemplary recipient selection screen 1559 provided by a mobile device 1557 wherein a user is prompted to select one or more recipients that are to receive the questionnaire currently populated in the previous screens. In general, a mobile device has a PIM or contact list in the device that provides contact information such as phone numbers and email addresses, etc. for people to whom the user of the mobile device can make or call or send information to. The present invention makes it possible to retrieve contact information for recipients of adhoc questionnaires (created in the mobile device) from PIMs, contact lists, etc.

In general, the user can select recipients on this recipient selection screen 1559 if the user has entered at least one question and has selected Done in a previous screen (described in FIG. 14). After scrolling to one of the recipients on the recipient list 1565 displayed, the user chooses a Select menu item 1563 (or a button if one is presented). Additional recipients from the list can be selected. When all required recipients have been selected from the list, the Done menu item 1561 (or a Done button if one is presented) needs to be activated to terminate the process and send the questionnaire. In one embodiment, the menu item Done 1561 is renamed as Send.

In general, the recipient entries in the recipient list 1565 can be a list of names representing valid users, a list of phone numbers, a list of mailing addresses, or a list of references to subscribers of a service. It can also comprise of a mailing list entry (a name or reference to a collection of email address or phone numbers). In one embodiment, the recipient list 1565 is a list of names with associated phone numbers (not shown on the screen as part of the list). The mobile device 1557 is capable of determining the phone numbers for the names selected by a user, the phone numbers subsequently communicated to the server as the recipient list. In another embodiment, mobile device 1557 is capable of determining the IP addresses (IPv4 or IPv6 addresses) for the names selected by a user, the IP addresses subsequently communicated to the server as the recipient list. In a different embodiment, the mobile device 1557 is capable of communicating the list of names selected by a user to the server as the recipient list, the server being capable of using them to determine the appropriate phone numbers for the recipients or appropriate IP address to communicate with the recipient devices. Other ways of communicating recipient lists are also contemplated.

In one embodiment, a preconfigured recipient list (with a unique name of its own) is also listed in the recipient list 1565. If the user selects this preconfigured recipient list, the mobile device 1557 will expand the preconfigured recipient list into appropriate phone numbers or IP addresses and send it to the server. Alternatively, the server expands the preconfigured recipient list into the actual phone numbers for the associated users or the actual IP address (or any other relevant mapping as needed).

In one embodiment, the server maintains a default mailing list for a user, to be used as a list of recipients when the user of the mobile device does not explicitly select any name or phone number from the recipient list 1565 before sending the adhoc questionnaire by activating the Done menu item 1561 or by other means.

Figure 16:
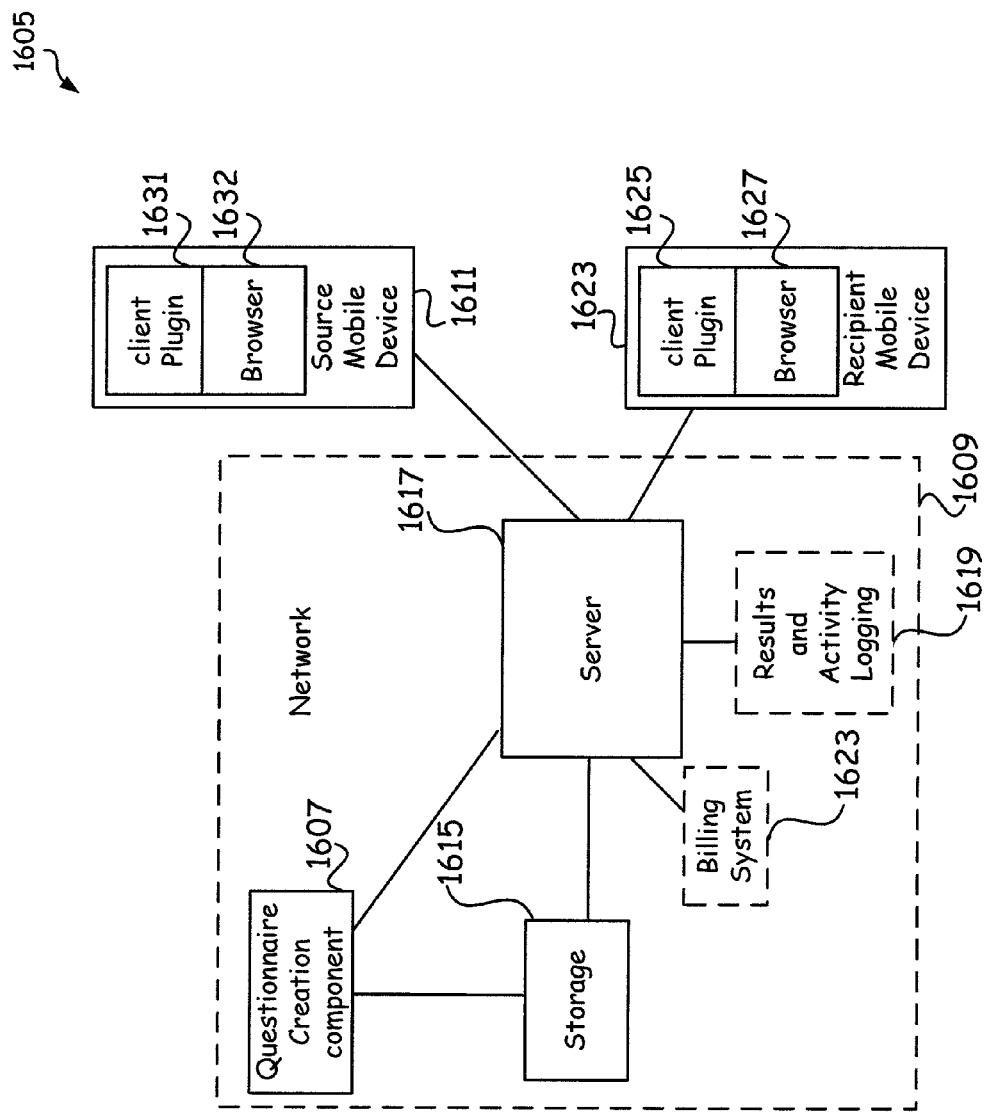
FIG. 16 is a perspective block diagram of a network wherein a source mobile device comprises a client plugin for a browser that makes it possible to create questionnaires in the source mobile device, and wherein the recipient mobile device comprises a client plugin for a browser that makes it possible to browse through questionnaires in the recipient mobile device.

FIG. 16 is a perspective block diagram of a network wherein a source mobile device 1611 comprises a client plugin 1631 for a browser 1632 that makes it possible to create questionnaires in the source mobile device 1611, and wherein the recipient mobile device 1623 comprises a client plugin 1625 for a browser 1627 that makes it possible to browse through questionnaires in the recipient mobile device 1623. The client plugin 1631 in the source mobile device 1611 receives incoming questionnaires from the browser and helps the user review them on the browser, answer the questions and provide results back to the server, listen to audio preambles of a questionnaire, the audio preambles of a question, audio supplementary information, etc. The browser 1632 receives questionnaires from a server 1617 and communicates them to the client plugin 1631 for processing. Similarly, the client plugin 1631 makes it possible for the user of the source mobile device 1611 to create new questionnaires using the browser as the conduit, the new questionnaires comprising of textual information and/or audio information (such as audio preambles of a question). For example, the user of the source mobile device 1611 activates a specific web page hosted by the server 1617 that provides a dialog box capable of invoking the functionality of the client plugin 1631, such as the functionality of recording a question preamble and functionality of creating a question that is provided by the client plugin 1631.

The use of the recipient mobile device 1623 to walk through (say, by means of browsing using a browser) the questions of a questionnaire is facilitated by the client plugin 1625 that works in conjunction with the browser 1627. In a related embodiment, the client plugin 1625 is capable of being used as a standalone application as well as a plugin for the browser 1627.

An optional billing system 1623 and an optional results and activity logging component 1619 makes it possible to bill a user for creation of questionnaires and the distribution of questionnaires, as well as the tracking of questionnaire creation, dissemination and responses generated.

In one embodiment, the client plugin 1631 is incorporated into the browser 1632 and the browser 1632 is capable of facilitating the creation of questionnaires or portions of a questionnaire in the mobile device 1611. Similarly, the client plugin 1625 is incorporated into the browser 1625 and the browser 1625 is capable of facilitating the browsing of questionnaires or portions of a questionnaire by the user of the recipient mobile device 1623.

Interaction between the source mobile device 1611 and a recipient mobile device 1623 are facilitated by the server 1617 wherein the source mobile 1611 creates an ad-hoc questionnaire that the server 1617 enhances by incorporating generic preambles and multiple-choice portions to the questions in the questionnaires and forwards it to the recipient mobile device 1623. The mobile devices 1611 and 1623 comprise the plugin client 1631, 1625 respectively that works with browsers 1632, 1627, respectively, to facilitate creation of questionnaires and browsing through any questionnaires received. The user of the source mobile device 1611 initially sends audio portions of questions and a list of recipients to the server 1617. The server 1617 then forwards the audio portion(s) to a questionnaire creation component 1607 to get the questionnaire populated and generic textual content and generic multiple choices (canned choices) inserted for the questions in the questionnaire. The server 1617 receives the updated questionnaire from the questionnaire creation component 1607 and stores it if needed (temporarily or permanently). The server 1617 disseminates the stored questionnaire to one or more recipient devices, such as the recipient mobile device 1623. Such dissemination can occur based on a schedule, based on availability of the recipient mobile device 1623, based on initiation of delivery by a source mobile device 1611, based on policies, etc.

Figure 17:
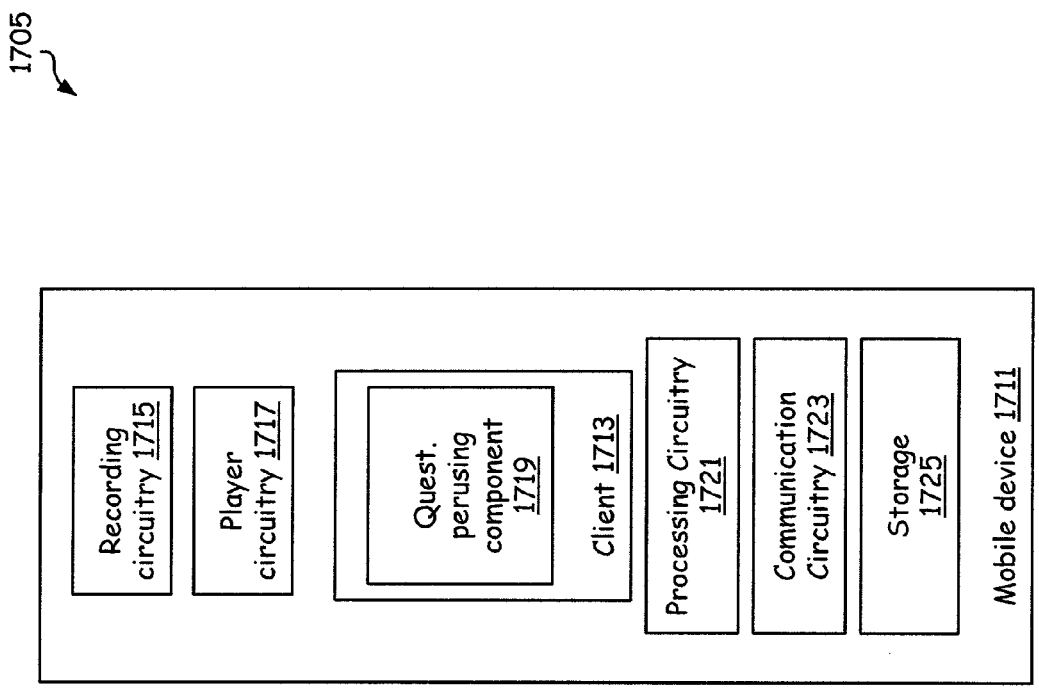
FIG. 17 is a perspective block diagram of a mobile device that is capable of creating questionnaires with audio preambles that are uploaded to a server, the mobile device also being capable of receiving questionnaires and facilitating the perusing of the downloaded questionnaire by a user.

FIG. 17 is a perspective block diagram of a mobile device 1711 that is capable of creating questionnaires with audio preambles that are uploaded to a server, the mobile device also being capable of receiving questionnaires and facilitating the perusing of the downloaded questionnaire by a user. The mobile device 1711 comprises a recording circuitry 1715, a player circuitry 1717, a communication circuitry 1723, a processing circuitry 1721, and storage 1725. The mobile device also comprises a client component 1713 that employs the recording circuitry 1715 to record audio preambles for questionnaires when the user is creating a questionnaire, and player circuitry 1717 to play audio preambles, audio supplementary information, etc. in questionnaires while the user is responding to questionnaires received. The mobile device 1711 is communicatively coupled to a remote server using the communication circuitry 1723.

The recording circuitry 1715 facilitates the recording of an audio portion of a questionnaire when activated. For example, when the client 1713 is configured to create new questionnaires in the mobile device 1711, it employs the recording circuitry 1715 to record preambles for the individual questions, preamble for the questionnaire itself, and supplementary information for questions and the questionnaire. Questionnaires created by the client 1713 are communicated to a server (when the questionnaire is ready and user initiates an upload) along with a recipient list that is stored in the storage associated with the server. The client 1713 can also be configured to receive questionnaires from the server for deferred display to a user. In addition, the client 1713 can support a user completing a questionnaire over multiple sessions, i.e. partially completing the questionnaire in any one session, with the ability to reopen a partially completed questionnaire for further browsing and completion.

The client 1713, employing the processing circuitry 1721, facilitates the communication, of questionnaires created or responses to questionnaires received and reviewed by a user, using the communication circuitry 1723. The questionnaires created are communicated to the server for forwarding the questionnaire to users associated with the recipient list provided by the user of the mobile device 1711 from the storage 1725 of the mobile device 1711 (or from a contact list of PIM in the mobile device 1711).

The client 1713 comprises a questionnaire perusing component 1719 that makes it possible for a user to peruse all the questions of a questionnaire, one question at a time, with support for playing audio preambles, if needed, and displaying supplementary text information or playing supplementary audio information, when requested by user.

In one embodiment, the recording circuitry 1715 is capable of recording not only audio in MP3, WMA, AMR formats but also video information too, such as in DVD, HDDVD, MPEG2, MPEG 4 formats. The player circuitry 1717 is capable of playing audio information (audio preambles provided in MP3, WMA, AMR and other formats) but also video content associated with the preamble of a question of a questionnaire. In a related embodiment, the player circuitry 1717 is capable of playing streaming audio and streaming video content provided to the user as preamble or as supplementary information for a question (or for the questionnaire itself).

Figure 18:
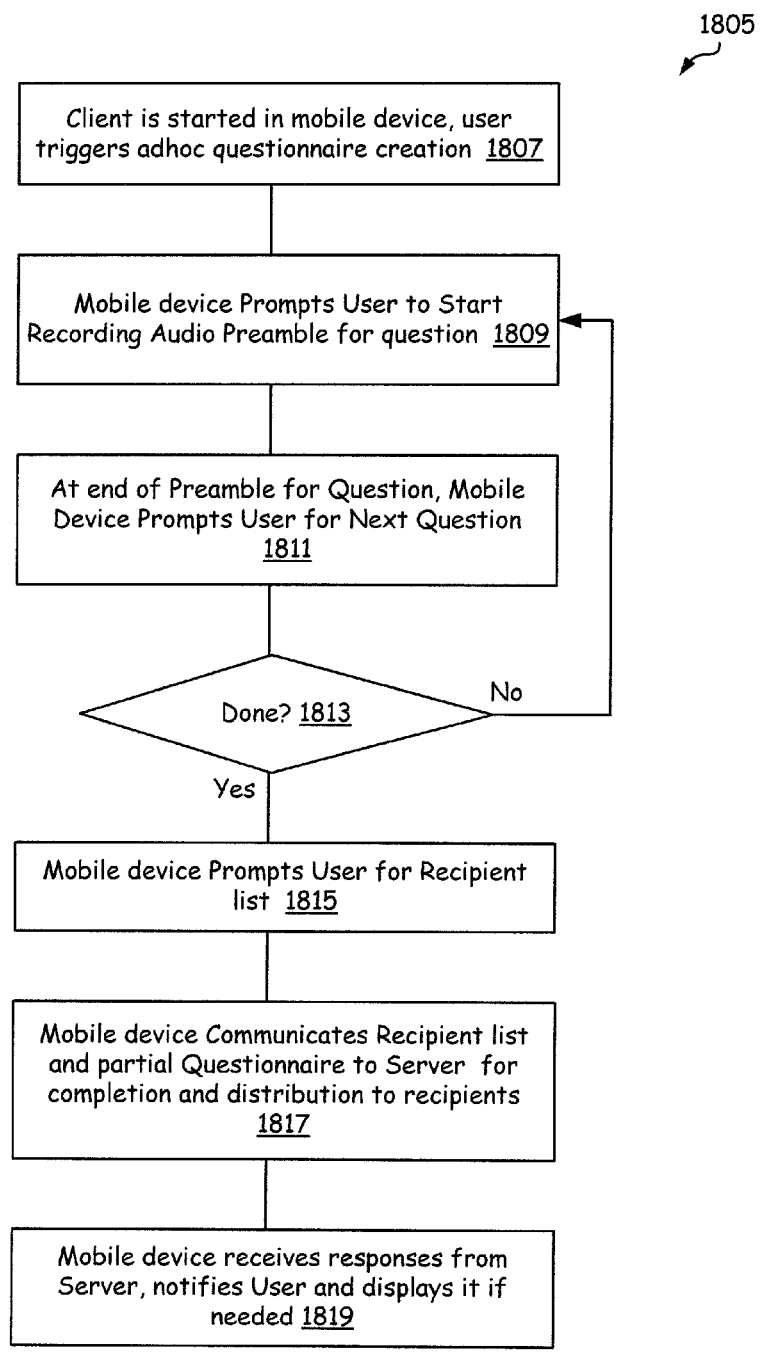
FIG. 18 is a flow chart of an exemplary operation of a mobile device built in accordance with the present invention as the mobile device is used by a user to create an adhoc questionnaire.

FIG. 18 is a flow chart of an exemplary operation of a mobile device built in accordance with the present invention as the mobile device is used by a user to create an adhoc questionnaire. At an initial block 1807, the client (such as QClient for questionnaires) is started in the mobile device and the client receives a activation/command to create a new adhoc questionnaire from the user. Then, at a next block 1809, the mobile device prompts the user to start recording audio preamble for a question (such as a first question). The user can start recording, by speaking into the general area of the microphone of the mobile device, very much like he would do in talking during a mobile phone call. The preamble for a question typically comprises details of the question, often with details of the choices of answers the user can select for the question too. This would make the preamble useful for adhoc questionnaires where both the question and the corresponding choices (of responses anticipated) are provided in audio form (by speaking into the mobile device while it is recording) by the user.

Then, at a next block 1811, at the end of recording of the preamble for the current question, the user has the option to record supplementary information or audio preambles for more questions. The mobile device prompts the user for next question. Then, at a next decision block 1813, an attempt is made to determine if the user wants to provide inputs for another question or if the user is done with the questionnaire. If it is determined that the user is not done and intends to create additional questions, then at the next block 1809, the mobile device prompts user to start recording audio preamble for the next question.

If, at the block 1813, it is determined that the user is done, then, at a next block 1815, the mobile device prompts the user for a list of recipients. The user can select one or more recipients from a list that is displayed to the user. The list is retrieved from a storage, or from a PIM, contact list, etc. The user can also select a preconfigured list. The mobile device may optionally convert the list of recipients to a list of phone numbers or a list if IP addresses.

Then, at a next block 1817, the mobile device communicates the recipient list and a partial questionnaire (with audio portions recorded and most of the textual portions not created yet) to the server for completion and for subsequent distribution to recipients. Finally, at a next block 1819 (presumably after the recipients have responded to the questionnaire) the mobile device receives responses from the server, notifies the user of its availability, and displays it if the user so desires.

Figure 19:
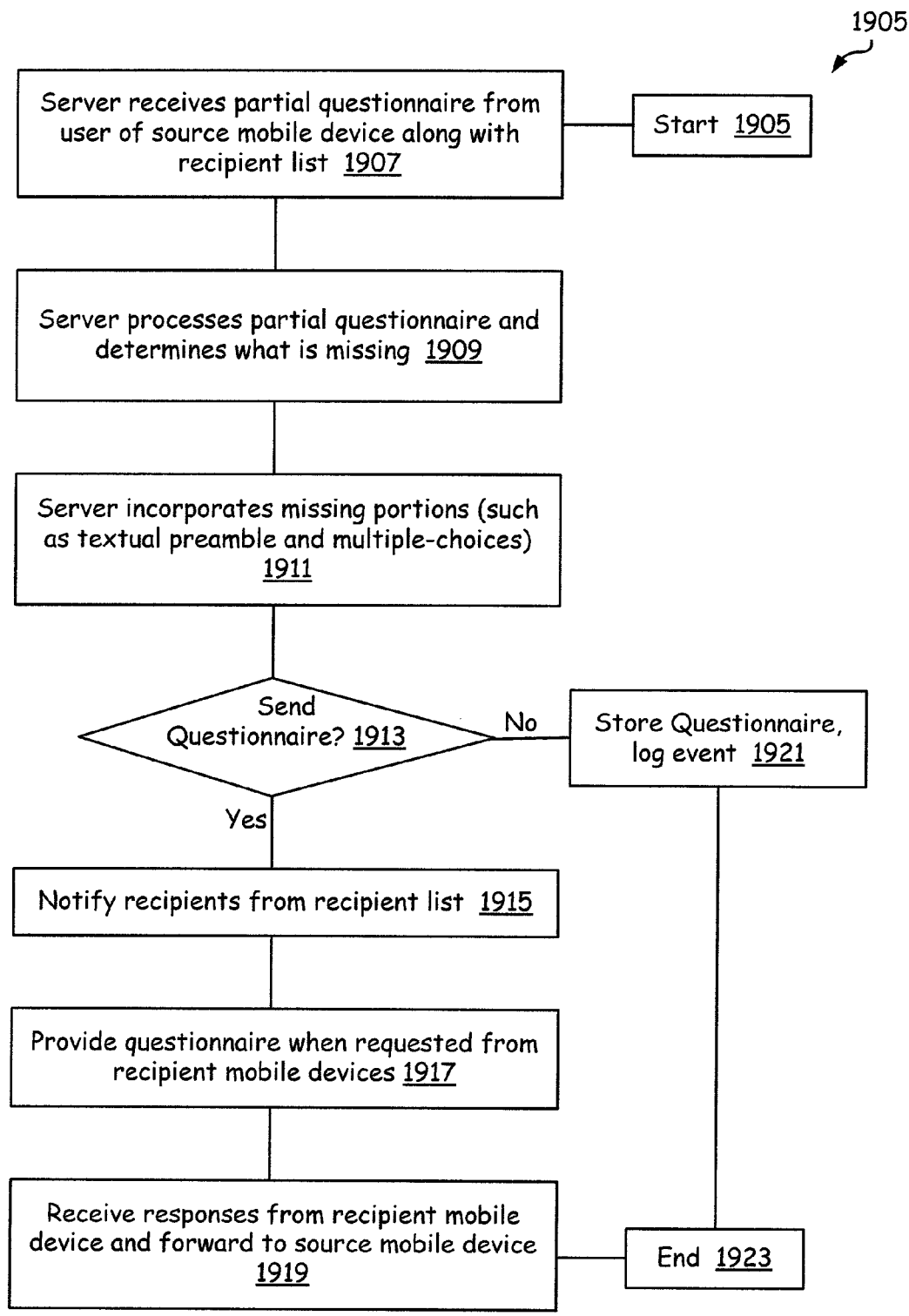
FIG. 19 is a flow chart showing exemplary behavior of the server in accordance with the present invention as the server supports adhoc creation of a questionnaire using a mobile device.

FIG. 19 is a flow chart showing exemplary behavior of the server in accordance with the present invention as the server supports adhoc creation of a questionnaire using a mobile device. At an initial block 1905, processing starts, and at the next block 1907, the server receives a partial questionnaire from the user of the source mobile device along with a recipient list. Then, at a next block 1909, the server processes the partial questionnaire and determines what is missing. Typically, for an adhoc questionnaire, a audio preamble for one or more questions is provided by the source mobile device and textual preambles, multiple-choice text, etc. may be missing.

Then, at a next block 1911, the server incorporates the missing portions, such as textual preamble and multiple choices. For example, the server inserts generic multiple choice text for the questions and generic textual preambles (or prompts) for the questions that don't have any. In addition, the server selectively adds a textual questionnaire preamble. It also inserts an audio questionnaire preamble, if one is available as a boilerplate questionnaire preamble (perhaps created by the user apriori). The server might even add generic supplementary information for the questionnaire and for the questions too, if the server is configured to do so. In one embodiment, the user provides a prerecorded music (such as a prerecorded jingle, a tune, a section of a song, etc.) as a boilerplate questionnaire preamble.

Later, at a next decision block 1913, the server determines if the questionnaire cannot be sent to the recipients provided by the source mobile device or recipient preconfigured into the server. If the server determines that the questionnaire cannot be sent, then at a next block 1921, it stores the questionnaire, logs information on the event, and subsequently terminates processing at the next end block 1923. It also optionally sends a notification to the user on the source mobile device that the questionnaire cannot be sent, requesting the user to access the server and optionally fix a problem.

If at a next decision block 1913, the server determines if the questionnaire can be sent to the recipients provided by the source mobile device or recipient preconfigured into the server, then at a next block 1915, the server notifies recipients from the recipient list regarding the availability of the questionnaire. For example, it sends an SMS message to the recipient/user over the recipient mobile device indicating the availability of the questionnaire. For example, it might also use the client (such as the questionnaire client) in the recipient mobile device to communicate a message regarding the availability of the questionnaire to the recipient. Other forms of notification, such as by means of instant messaging and email are also contemplated. In one embodiment, the notification sent to the recipient mobile device over SMS triggers the silent activation of the client software associated with the questionnaire for downloading and processing the questionnaire.

Then, at a next block 1917, the questionnaire is provided to the recipient mobile device when it requests the questionnaire from the server. If more than one recipient is to be supported, then each recipient retrieves the questionnaire from the server, typically in response to a notification that is sent, or in response to a user action. Then, at a next block 1919, the response provided by the recipient (actually, by all the recipients associated) over the recipient mobile device is received by the server and forwarded to the source mobile device. The responses from several recipient mobile devices are collated before it is sent to the source mobile device if the server is configured to do so. Otherwise, individual results from each user are forwarded to the source mobile device as they are received.

In one embodiment, at the block 1915, the server opens up a TCP/IP socket connection (or some such connection) with the client in the recipient mobile device to not only communicate a notification message but also to deliver the questionnaire to the client in the device, thus combining the processing of the blocks 1915 and 1917.

Figure 20:
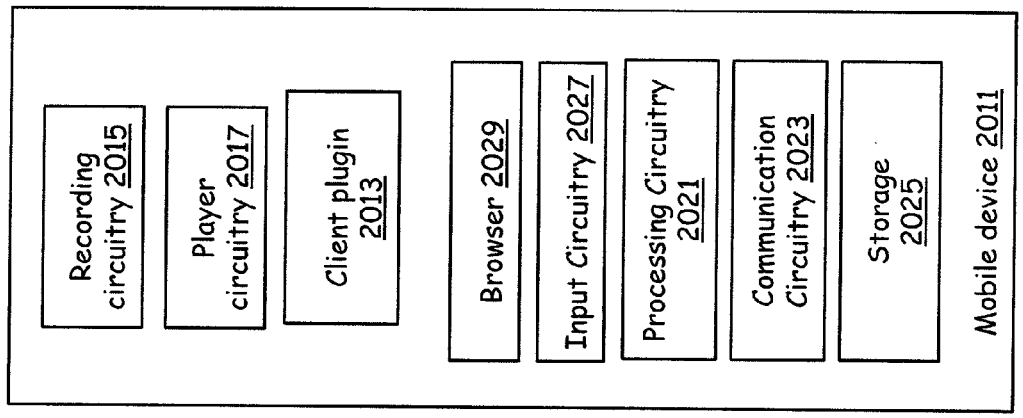
FIG. 20 is a perspective block diagram of a mobile device with a browser and a client plugin that is capable of creating questionnaires with audio preambles that are uploaded to a server, the mobile device also being capable of receiving questionnaires and facilitating the perusing of the downloaded questionnaire by a user.

FIG. 20 is a perspective block diagram of a mobile device 2011 with a browser 2029 and a client plugin 2013 that is capable of creating questionnaires with audio preambles that are uploaded to a server, the mobile device also being capable of receiving questionnaires and facilitating the perusing of the downloaded questionnaire by a user. The client plugin 2013 is able to employ the services of the browser for retrieving questionnaires (one question at a time if needed) delivering partial responses or complete responses, etc. The browser making it possible to connect to a server capable of providing the questionnaire, either all at once, in sets of questions, or one question at a time.

The mobile device 2011 comprises a recording circuitry 2015, player circuitry 2017, communication circuitry 2023, processing circuitry 2021, and storage 2025. The mobile device 2011 also comprises the client plugin 2013 that employs the recording circuitry 2015 to record audio preambles for questionnaires when the user is creating a questionnaire, and the player circuitry 2017 to play audio preambles, audio supplementary information, etc. in questionnaires while the user is responding to questionnaires received. The mobile device also comprises the browser 2029 with which the client plugin 2013 interacts.

The mobile device 2011 is communicatively coupled to a server using the communication circuitry 2023. For example, it uses the HTTP based protocol to connect to the server and retrieve questionnaires, send responses, receive notifications, etc.

The recording circuitry 2015 facilitates the recording of an audio portion of a questionnaire when activated. For example, when the client 2013 plugin is configured to create new questionnaires in the mobile device 2011, it employs the recording circuitry 2015 to record preambles for the individual questions, preamble for the questionnaire itself, and supplementary information for questions and the questionnaire. Questionnaires created by the client plugin 2013 are communicated to a server (when the questionnaire is ready and user initiates an upload) via the browser 2029 along with a recipient list that is stored in the storage associated with the server.

The processing circuitry 2021 facilitates the communication, of questionnaires created or responses to questionnaires received, using the communication circuitry 2023. The questionnaires created are communicated to the server for forwarding the questionnaire to users associated with the recipient list. The client plugin 2013 employs the browser 2029 to peruse through a questionnaire, thus making it possible for a user to peruse all the questions of a questionnaire, one question at a time, with support for playing audio preambles, if needed, and displaying supplementary text information or playing supplementary audio information, when requested by user.

In one embodiment, the recording circuitry 2015 is capable of recording not only audio but video information too, such as in MPEG 4 formats. The player circuitry 2017 is capable of playing audio information (audio preambles) but also video content associated with the preamble of a question of a questionnaire. In a related embodiment, the player circuitry 2017 is capable of playing streaming audio and streaming video content provided to the user as preamble or as supplementary information for a question (or for the questionnaire).

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The terms "audio preamble" and "voice preamble" as used herein may refer to recorded voice inputs that a user records, to provide a question/prompt in human language, that also selectively incorporates responses in multiple choice format to aid selection by a recipient. The audio preamble may be captured by a mobile device in MP3 format, AMR format, WMA format, etc.

The term "audio-assisted questionnaire" as used herein may refer to a questionnaire comprising audio portions, such as audio preambles, audio supplementary information, audio descriptions of multiple choices, etc. that make it possible for a recipient to listen to most of the information of the questions in a questionnaire (employing human voices, in audible form) without having to read all of that in a small screen of a mobile device, without requiring scrolling through textual descriptions on a limited/constrained device.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method performed by a system comprising a server communicatively coupled wirelessly to a plurality of mobile devices, the server comprising a processor, memory and storage, wherein each of the plurality of mobile devices comprise a corresponding mobile display, mobile processor and mobile memory, the method comprising:
creating a video input on one of the plurality of mobile devices and communicating it to the server to be distributed as part of a questionnaire;
receiving, by the server, the questionnaire created on the one of the plurality of mobile devices by a corresponding pre-registered user;
analyzing, by the server, the questionnaire and the video input;
modifying the questionnaire, by the server, as needed;
distributing, by the server, the modified questionnaire with the video input, to a list of recipients for display and sharing, wherein the list of recipients corresponds to at least one of the plurality of mobile devices;
wherein the server selectively communicates a notification to the list of recipients providing information on the questionnaire and selectively conducts billing;
wherein the list of recipients for the questionnaire is specified by picking one or more recipients from a contact list, by identifying a mailing list or by identifying a list of phone numbers; and
receiving, by the server, a user response or feedback from the at least one of the plurality of mobile devices.

2. The method of claim 1 wherein the video input is a streaming video content provided as part of the questionnaire.

3. The method of claim 1 wherein the questionnaire is an adhoc query created by a user.

4. The method of claim 1 further comprising:
sending a notification, by the server, to target devices among the plurality of mobile devices, the target devices corresponding to the list of recipients, wherein the notification provides information on the questionnaire.

5. The method of claim 1 further comprising:
managing, by the server, the lifecycle of the questionnaire.

6. The method of claim 1 further comprising:
managing, by the server, user accounts setup by registered users.

7. The method of claim 1 further comprising:
charging, by the server, based on the number of recipients to whom the questionnaire is communicated.

8. The method of claim 1 further comprising:
charging, by the server, based on the number of recipients from whom the user response is received.

9. The method of claim 1 further comprising:
waiting, by the server, for a duration of a predetermined time for the arrival of the user responses from the list of recipients before reporting the collection of user responses.

10. A server infrastructure comprising a processing circuitry and memory coupled to the processing circuitry, the server infrastructure communicatively coupled wirelessly to a plurality of mobile devices, wherein each of the plurality of mobile devices comprise a corresponding mobile display, mobile processor and mobile memory, the server infrastructure comprising;
an interface circuitry coupled to the processing circuitry for communicating information to and from the server, wherein the processing circuit, memory, and interface circuitry interoperate to enable the following:
a first interface to receive a questionnaire created by an application on one of the plurality of mobile devices wherein the questionnaire comprises a video input created or provided by the one of the plurality of mobile devices, wherein the one of the plurality of mobile devices is associated with a pre-registered user;
the first interface configured to analyze the questionnaire;
the first interface configured to communicate the questionnaire to at least one of the plurality of mobile devices for display or sharing based on a recipient list, wherein the recipients list corresponds to the at least one of the plurality of mobile devices;
the first interface configured to receive responses or feedback from one or more of the at least one of the plurality of mobile devices;
the first interface configured to communicate a collection of responses to the one of the plurality of mobile devices; and
wherein the first interface communicates the collection of responses or feedback individually as they are received, or sends them as sets of responses and communicates a billing event to a billing system.

11. The server infrastructure of claim 10 wherein the recipients list is received from the one of the plurality of mobile devices along with the questionnaire.

12. The server infrastructure of claim 11 wherein the recipients list is determined by the server.

13. The server infrastructure of claim 10 wherein the first interface is further configured to capture user responses provided by the at least one of the plurality of mobile devices.

14. A method performed by a downloadable interaction client application in a mobile device communicatively coupled wirelessly to a server in a system for questionnaires, the mobile device comprising a processor circuitry and memory coupled to the processor circuitry collectively capable of executing the downloadable interaction client, the method comprising the steps of:
receiving a first questionnaire from the server for displaying to a user, wherein the first questionnaire comprises a video input;
analyzing the first questionnaire for display and user interaction by a pre-registered user;
facilitating user interactions with the first questionnaire even while displaying video input, wherein user interactions comprises textual data entry, multiple choice selections, recording an audio message, recording a video message, taking a digital image employing a camera, and selecting an entry from a list;

communicating a user response or feedback collected to the first questionnaire based on the user interactions; and communicating a billing event to a billing system to selectively charge, based on policies and preferences, for the user response provided to the first questionnaire.

15. The method of claim 14 further comprising:

facilitating creation of a second questionnaire wherein the second questionnaire comprises multiple questions, each question with a preamble, a multiple choice section and user prompts soliciting user inputs;

storing the second questionnaire at the server, for dissemination to a list of recipients;

receiving a collated user response set from the server; and presenting the collated user response set for review by a user.

16. The method of claim 15 wherein the preamble is a textual preamble with an audio component, and wherein at least one of the user prompts solicits a digital photo, a video or an audio input.

17. The method of claim 14 wherein the user response collected to the first questionnaire comprises at least one of an audio response, a video response, an image response, and a text response.

18. The method of claim 14 further comprising:

sending a the list of recipients to the server, wherein the list of recipients for the first questionnaire is specified by picking one or more recipients from a contact list, by identifying a pre-configured mailing list that provides an identification or a reference to the recipients, or by identifying a preconfigured list of phone numbers.

19. The method of claim 14 further comprising:

communicating with a billing system to selectively charge, based on policies and preferences, for the user response provided to the first questionnaire;

initiating a charge activity causing a questioner sender to pay a questionnaire fee; and selectively causing a list of recipients to be paid an incentive payment.

20. The method of claim 14 wherein the video input is a streaming video content comprising one or more of a questionnaire preamble, a question preamble, supplementary information for a question, details describing the choices available, details associated with multiple-choice selection items, and information regarding the questions in a questionnaire and instructions on how best to respond to them.

* * * * *